United States Patent
Latif et al.

(10) Patent No.: US 11,893,185 B2
(45) Date of Patent: Feb. 6, 2024

(54) PIXEL ARRAY AND TOUCH ARRAY CROSSTALK MITIGATION SYSTEMS AND METHODS

(71) Applicant: Apple Inc., Cupertino, CA (US)

(72) Inventors: Salman Latif, Sunnyvale, CA (US); Si Mohamed Aziz Sbai, Cupertino, CA (US); Mahesh B Chappalli, San Jose, CA (US); Marc J DeVincentis, Palo Alto, CA (US); Timothy M Henigan, Carlsbad, CA (US); Sanjay Mani, Los Altos Hills, CA (US); Rohit Natarajan, Sunnyvale, CA (US); Paolo Sacchetto, Cupertino, CA (US); Rohit K Gupta, Santa Clara, CA (US); Meir Harar, Tel-Aviv (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/903,819

(22) Filed: Sep. 6, 2022

(65) Prior Publication Data

US 2023/0093204 A1 Mar. 23, 2023

Related U.S. Application Data

(60) Provisional application No. 63/245,732, filed on Sep. 17, 2021.

(51) Int. Cl.
*G06F 3/041* (2006.01)
*G06F 3/044* (2006.01)
*G06F 11/34* (2006.01)

(52) U.S. Cl.
CPC .......... *G06F 3/0418* (2013.01); *G06F 3/0445* (2019.05); *G06F 11/3438* (2013.01)

(58) Field of Classification Search
CPC .. G06F 3/0418; G06F 3/0445; G06F 11/3438; G06F 3/04184; G06F 3/041; G06F 3/044
See application file for complete search history.

(56) References Cited

U.S. PATENT DOCUMENTS

| | | | |
|---|---|---|---|
| 8,154,533 B2 | 4/2012 | Jung et al. | |
| 9,075,259 B2 | 7/2015 | Kim | |
| 9,310,916 B2 | 4/2016 | Krah | |
| 10,771,108 B1 | 9/2020 | Fazeel et al. | |
| 2003/0011537 A1* | 1/2003 | Dunphy | G09G 3/22 345/30 |
| 2013/0083180 A1* | 4/2013 | Sasaki | H04N 23/673 348/E5.045 |

(Continued)

FOREIGN PATENT DOCUMENTS

KR 101725033 B1 2/2015

*Primary Examiner* — Md Saiful A Siddiqui
(74) *Attorney, Agent, or Firm* — Fletcher Yoder, P.C.

(57) ABSTRACT

Systems, methods, and devices are described that may mitigate pixel and touch crosstalk noise. A touch processing system may compensate touch scan data to reduce the noise based on a luminance value. An image processing system may determine the luminance value based on image data and a display brightness value of an electronic display. Using the compensated touch scan data, the touch processing system may determine a proximity of a capacitive object to at least one touch sense region of the electronic display.

27 Claims, 19 Drawing Sheets

(56) References Cited

U.S. PATENT DOCUMENTS

| | | | |
|---|---|---|---|
| 2014/0043281 A1* | 2/2014 | Kim | G06F 3/0418 345/174 |
| 2015/0042597 A1 | 2/2015 | Wang | |
| 2016/0027146 A1* | 1/2016 | Kim | G09G 3/3208 345/82 |
| 2016/0246430 A1* | 8/2016 | Wang | G06F 3/04184 |
| 2017/0064344 A1* | 3/2017 | Petersen | H04N 21/44004 |
| 2018/0081491 A1* | 3/2018 | Holland | G06F 3/04184 |
| 2021/0118349 A1 | 4/2021 | Choi et al. | |
| 2022/0404932 A1* | 12/2022 | Gray | G06F 3/0445 |

* cited by examiner

PIXEL ARRAY AND TOUCH ARRAY CROSSTALK MITIGATION SYSTEMS AND METHODS

CROSS-REFERENCE TO RELATED APPLICATION

This application claims the benefit of U.S. Provisional Application No. 63/245,732, filed Sep. 17, 2021, and entitled "PIXEL ARRAY AND TOUCH ARRAY CROSSTALK MITIGATION SYSTEMS AND METHODS," which is hereby incorporated by reference in its entirety for all purposes.

SUMMARY

This disclosure relates to mitigating crosstalk between display and touch subsystems and, more specifically, to mitigating undesired capacitive interaction between the subsystems.

A summary of certain embodiments disclosed herein is set forth below. It should be understood that these aspects are presented to provide the reader with a brief summary of these certain embodiments and that these aspects are not intended to limit the scope of this disclosure.

Electronic displays may be found in numerous electronic devices, from mobile phones to computers, televisions, automobile dashboards, and augmented reality or virtual reality glasses, to name just a few. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (µLEDs). By causing different display pixels to emit different amounts of light, individual display pixels of an electronic display may collectively produce images.

An electronic display may include both a display subsystem and a touch subsystem, such as in an integrated panel or system-on-a-chip (SOC). However, these subsystems may experience crosstalk during operation. Examples of the crosstalk include Impedance-based Display-Touch Crosstalk (Impedance DTX) or Switching-based Display-Touch Crosstalk (Switching DTX).

With Impedance DTX, image data presented by the display may cause image data-dependent changes in an impedance used when generating a touch sensing signal. Impedance DTX may result in a touch baseline shift where the touch scan data gets modulated by display image content changing cathode impedance. In Switching DTX, a parasitic coupling path may form between a pixel layer and a touch sensing electrode layer while image data is transmitted, which can increase noise in touch sensing signals based on values of the image data and value changes between temporally separated image data. Switching DTX may involve display signals (e.g., data and gate waveforms) to couple to a touch receiver (RX) as noise. Thus, it may be desirable to reduce crosstalk between the display and touch subsystems, and in particular the Impedance DTX and/or Switching DTX.

To compensate for Impedance DTX, a touch sensing system may determine cathode impedance during a touch scan. The cathode impedance may be content dependent and spatially varying. An image processing system may calculate pixel luminance values for a display frame or any other metric that can estimate cathode impedance. The image processing system may transmit the pixel luminance values and a global brightness value to the touch sensing system. The touch processing system may use the pixel luminance values and the global brightness value to determine a cathode current, which may be used as a proxy for the cathode impedance. Indeed, the touch processing system may use the cathode current to estimate and cancel out the undesired Impedance DTX component of the touch sensing signal.

To compensate for Switching DTX, the image processing system may send gate clock and content dependent data line toggling information to the touch processing system. The image processing system may calculate differences between the average voltage values for each row of the display image frame. The image processing system may also calculate the magnitude of a gate clock. The touch processing system may compute a noise contribution to the touch scan data from the Switching DTX using the data/clock toggling information. Since Switching DTX may worsen as voltage differences between rows increase, indications of these signals may be used to predict an expected Switching DTX value as a computed noise signal to be used to compensate for the Switching DTX. The touch processing system may use the computed noise contribution to cancel out the Switching DTX component from the touch scan data.

BRIEF DESCRIPTION OF THE DRAWINGS

Various aspects of this disclosure may be better understood upon reading the following detailed description and upon reference to the drawings described below.

DETAILED DESCRIPTION

Figure 1:
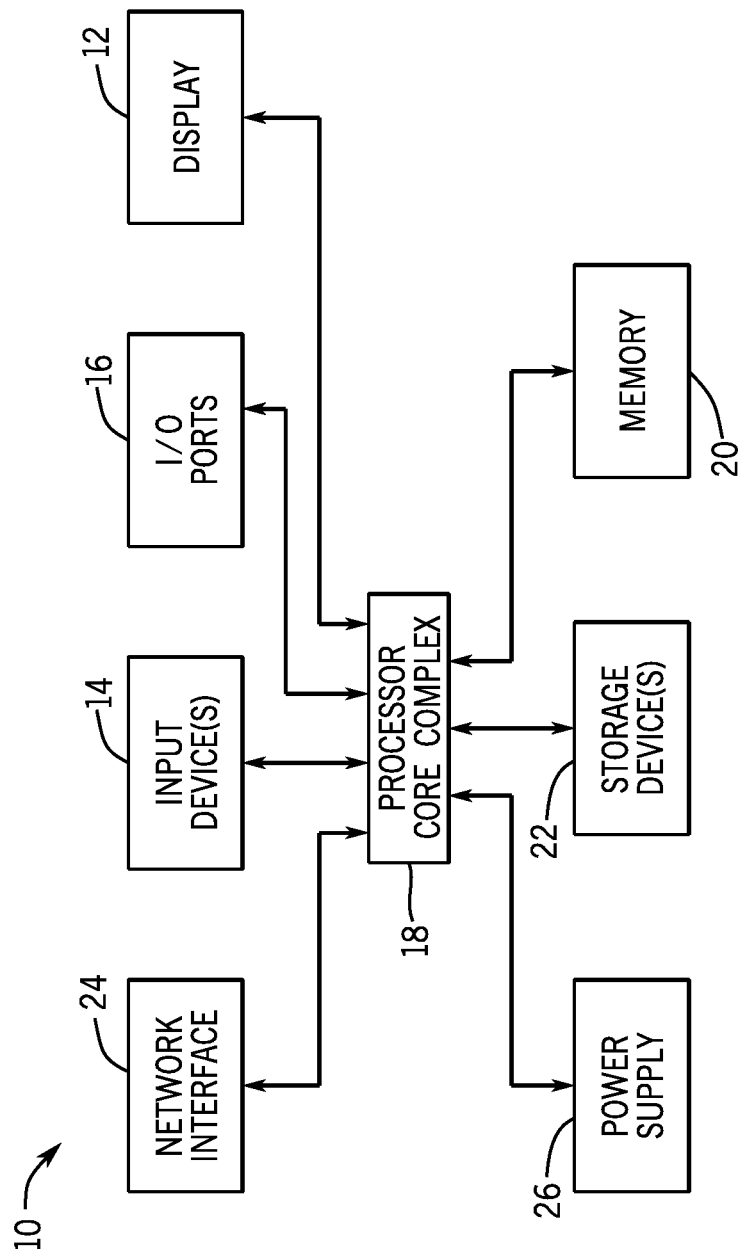
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

The present disclosure provides systems and methods for integrating a touch panel and a display panel into a single panel, which may reduce material costs and to lower component footprints within an electronic display or device. For devices with integrated display and touch subsystems, special care must be taken to avoid crosstalk and noise between the subsystems. Examples of the crosstalk include Impedance-based Display-Touch Crosstalk (Impedance DTX) or Switching-based Display-Touch Crosstalk (Switching DTX), which may change the capacitance sensed and lead to inaccurate touch sensing operations.

Inaccurate or undesired touch sensing operations may lead to lagged response of the electronic device to the tactile input, performance of incorrect operations in response to the tactile input, undesirable results to occur in response to the tactile input, or the like. When undesired operations are performed in response to tactile inputs, computing resources may be spent performing the undesired operations, ending the undesired operations, or correcting the undesired operations in response to further received tactile input. Thus, it may be desirable to mitigate the Impedance DTX and/or Switching DTX to improve user experience with the electronic device, as well as electronic device performance by reducing a likelihood of inefficient allocation of computing resources.

Keeping the foregoing in mind, described herein are systems and methods that may mitigate effects of the Impedance DTX and/or the Switching DTX to improve user experience and device performance. Indeed, the systems and methods may use indications of the image data associated with the Impedance DTX and the Switching DTX to determine and remove an amount of error expected to alter touch scan data. By removing the expected error from the touch scan data, the systems and methods may compensate for the crosstalk.

To compensate for Impedance DTX, a touch sensing system may determine cathode impedance during a touch scan. The cathode impedance may be content dependent and spatially varying. An image processing system may calculate pixel luminance values for a display frame or any other metric that can estimate cathode impedance. The image processing system may transmit the pixel luminance values and a global brightness value to the touch sensing system. The touch processing system may use the pixel luminance values and the global brightness value to determine a cathode current, which may be used as a proxy for the cathode impedance. Indeed, the touch processing system may use the cathode current to estimate and cancel out the undesired Impedance DTX component of the touch sensing signal.

To compensate for Switching DTX, the image processing system may send gate clock and content dependent data line toggling information to the touch processing system. The image processing system may calculate differences between the average voltage values for each row of the display image frame. The image processing system may also calculate a signal magnitude of pulses of a gate clock used when presenting image frames. The touch processing system may compute a noise contribution to the touch scan data from the Switching DTX using the data/clock toggling information. Since Switching DTX may worsen as voltage differences between rows increase, indications of these signals may be used to predict an expected Switching DTX value as a computed noise signal to be used to compensate for the Switching DTX. The touch processing system may use the computed noise contribution to cancel out the Switching DTX component from the touch scan data.

Compensating for display pixel-touch crosstalk (e.g., Impedance DTX, Switching DTX) may improve device operation. For example, an electronic device compensating for the crosstalk may improve performance of the touch processing subsystem and/or may reduce an amount of power consumed by the touch processing subsystem by mitigating interference associated with the crosstalk. These compensation techniques also may enable greater touch frequency operation. A wide variety of electronic display and tactile input devices may benefit from these operations described herein since these compensation operations may be deployed across a wide range of devices including phones, tablets, watches, desktops, and even other displays with integrated touch and display panels. Moreover, touch performance of the display panel may be quantified by comparing performance while the operations are performed vs. while the operations are not performed. This may enable selective use of the crosstalk compensation operations and further power reductions by compensating for the crosstalk when most appropriate. For example, crosstalk compensation operations may be performed in response to particularly noisy data expected or scheduled to be displayed, in response to periodic timelines or schedules, in response to an input via an input device, or other suitable inputs or signals to trigger performance of the crosstalk compensations.

These described systems and methods may be used by any device which tight integration of display and touch subsystems, such as displays with in-cell or on-cell touch. Other systems, however, may also benefit from using these systems and methods (e.g., non-integrated but spatially nearby display and touch subsystems). With this in mind, an example of an electronic device 10, which includes an electronic display 12 that may benefit from these features, is shown in FIG. 1.

FIG. 1 is a schematic block diagram of the electronic device 10. The electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a vehicle dashboard, and/or the like. Thus, it should be noted that FIG. 1 is merely one example of a particular implementation and is intended to illustrate the types of components that may be present in an electronic device 10.

In addition to the electronic display 12, as depicted, the electronic device 10 includes one or more input devices 14, one or more input/output (I/O) ports 16, a processor core complex 18 having one or more processors or processor cores and/or image processing circuitry, memory 20, one or more storage devices 22, a network interface 24, and a power supply 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the storage devices 22 may be included in a single component. Additionally or alternatively, image processing circuitry of the processor core complex 18 may be disposed as a separate module or may be disposed within the electronic display 12.

The processor core complex 18 is operably coupled with the memory 20 and the storage device 22. As such, the processor core complex 18 may execute instructions stored in memory 20 and/or a storage device 22 to perform operations, such as generating or processing image data. The processor core complex 18 may include one or more microprocessors, one or more application specific processors (ASICs), one or more field programmable logic arrays (FPGAs), or any combination thereof.

In addition to instructions, the memory 20 and/or the storage device 22 may store data, such as image data. Thus, the memory 20 and/or the storage device 22 may include one or more tangible, non-transitory, computer-readable media that store instructions executable by processing circuitry, such as the processor core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a 4th Generation (4G), Long-Term Evolution (LTE), or 5th Generation (5G) cellular network. In other words, the network interface 24 may enable the electronic device 10 to transmit data (e.g., image data) to a communication network and/or receive data from the communication network.

The power supply 26 may provide electrical power to operate the processor core complex 18 and/or other components in the electronic device 10, for example, via one or more power supply rails. Thus, the power supply 26 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as image data, with the portable storage device.

The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the electronic display 12. The touch sensing components may receive user inputs by detecting occurrence and/or position of an object contacting the display surface of the electronic display 12.

In addition to enabling user inputs, the electronic display 12 may provide visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include a display panel with one or more display pixels. The display pixels may represent sub-pixels that each control a luminance of one color component (e.g., red, green, or blue for a red-green-blue (RGB) pixel arrangement).

The electronic display 12 may display an image by controlling the luminance of its display pixels based at least in part image data associated with corresponding image pixels in image data. In some embodiments, the image data may be generated by an image source, such as the processor core complex 18, a graphics processing unit (GPU), an image sensor, and/or memory 20 or storage devices 22. Additionally, in some embodiments, image data may be received from another electronic device 10, for example, via the network interface 24 and/or an I/O port 16.

Figure 2:
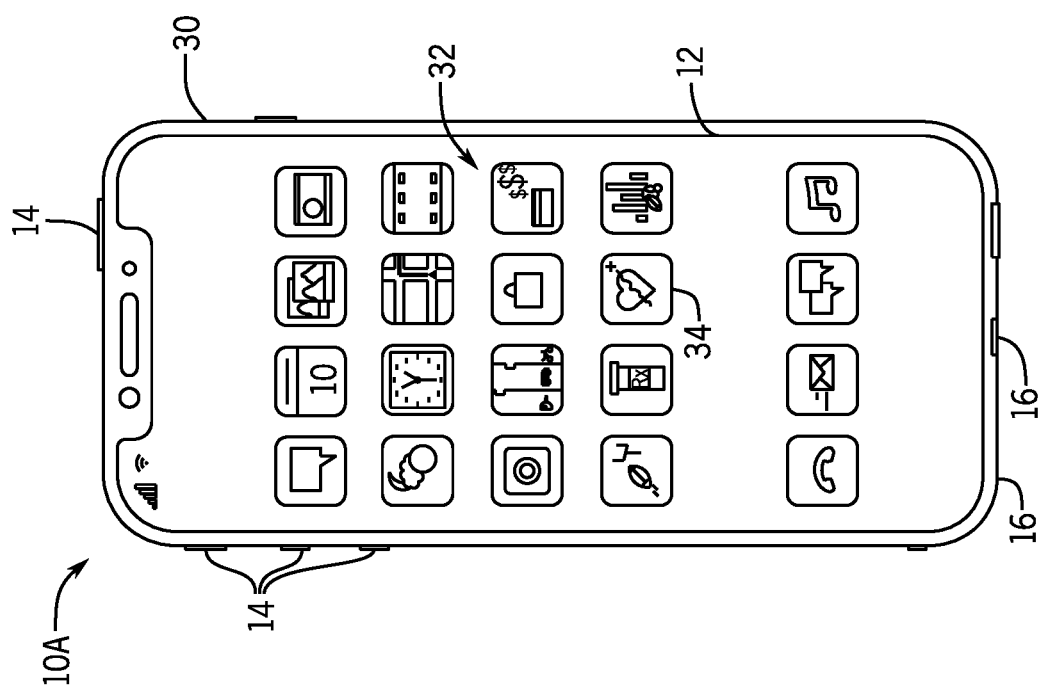
FIG. 2 is a front view of a mobile phone representing an example of the electronic device of FIG. 1, in accordance with an embodiment.

One example of the electronic device 10, specifically a handheld device 10A, is shown in FIG. 2. FIG. 2 is a front view of the handheld device 10A representing an example of the electronic device 10. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 30 (e.g., housing). The enclosure 30 may protect interior components from physical damage and/or shield them from electromagnetic interference. In the depicted embodiment, the electronic display 12 is displaying a graphical user interface (GUI) 32 having an array of icons 34. By way of example, when an icon 34 is selected either by an input device 14 or a touch sensing component of the electronic display 12, an application program may launch.

Input devices 14 may be provided through the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 30. The I/O ports 16 may include, for example, a Lightning® or Universal Serial Bus (USB) port.

Figure 3:
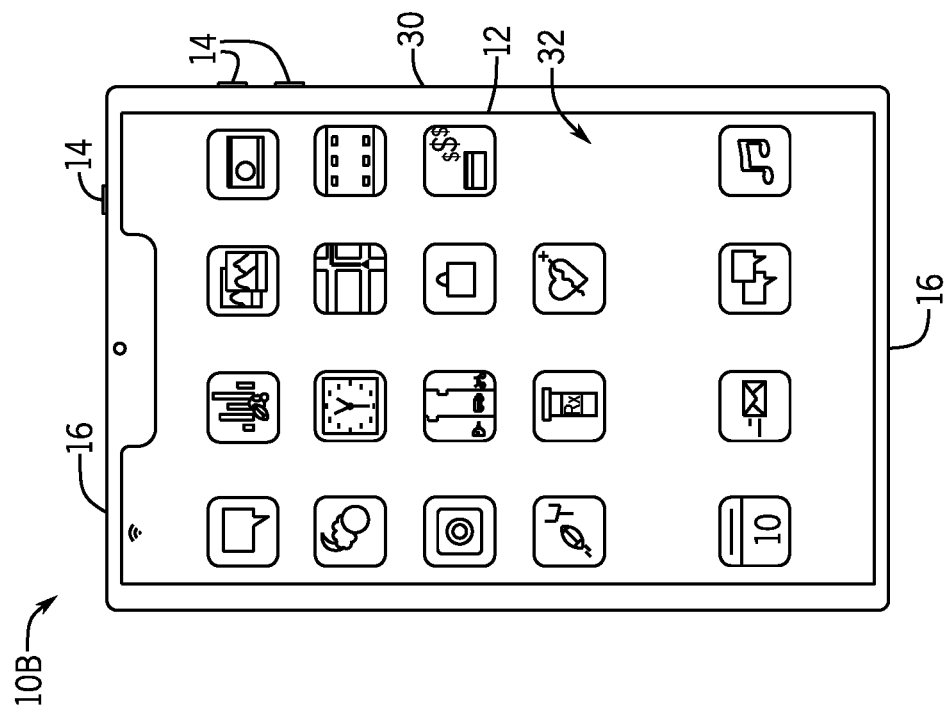
FIG. 3 is a front view of a tablet device representing an example of the electronic device of FIG. 1, in accordance with an embodiment.
Figure 4:
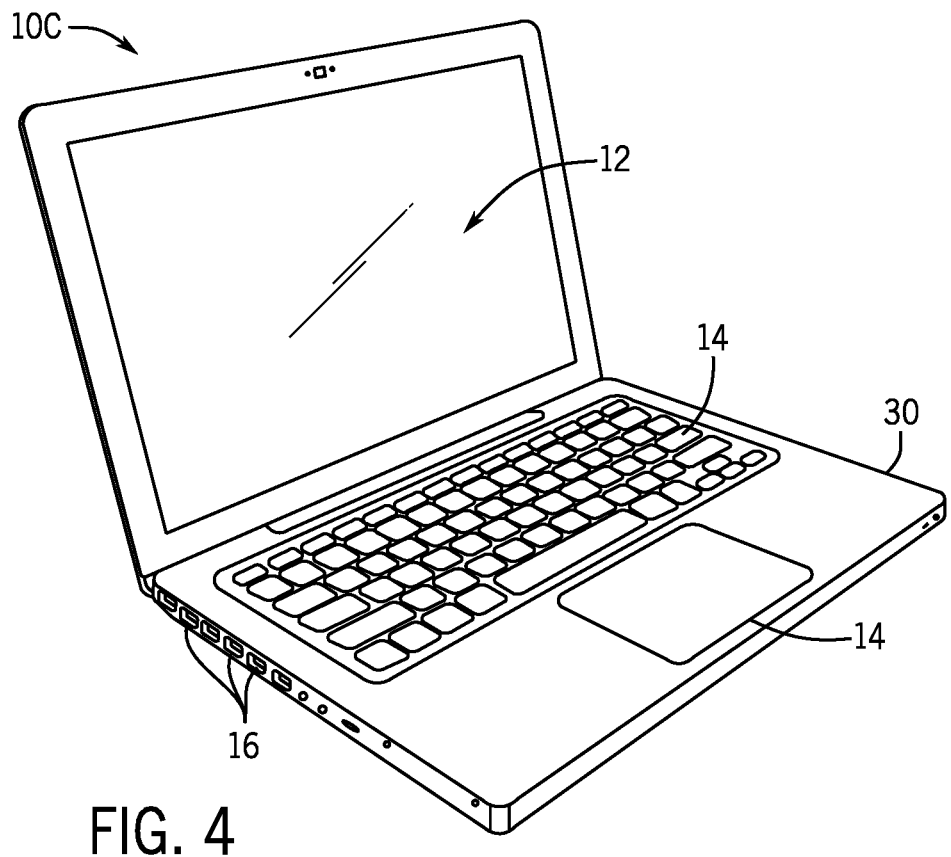
FIG. 4 is a front view of a notebook computer representing an example of the electronic device of FIG. 1, in accordance with an embodiment.
Figure 5:
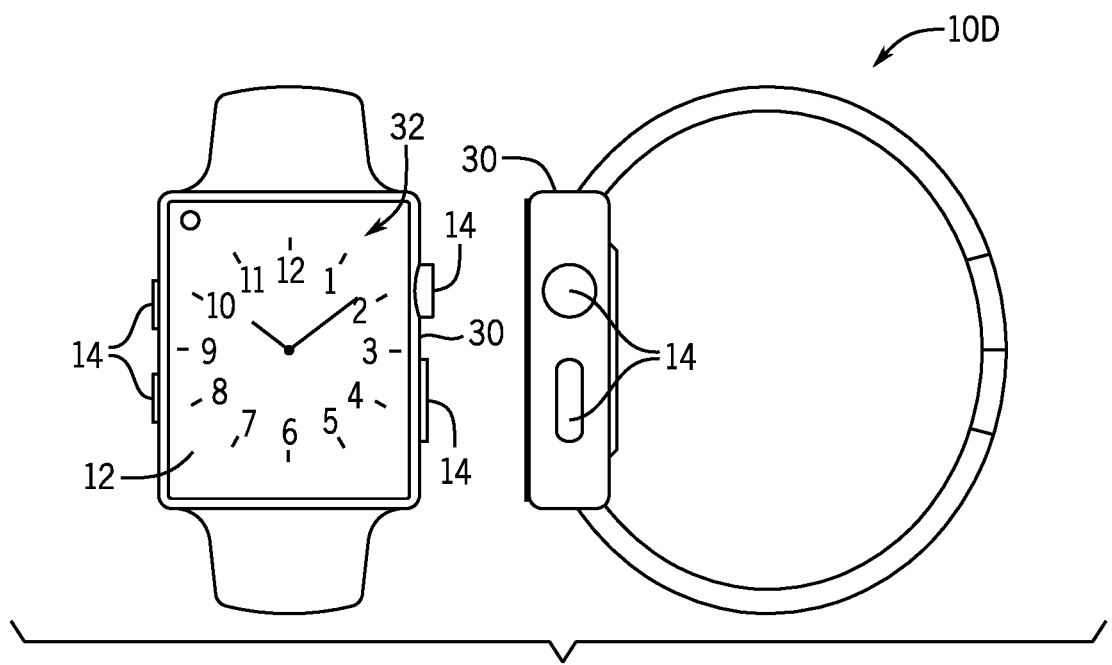
FIG. 5 are front and side views of a watch representing an example of the electronic device of FIG. 1, in accordance with an embodiment.

The electronic device 10 may take the form of a tablet device 10B, as shown in FIG. 3. FIG. 3 is a front view of the tablet device 10B representing an example of the electronic device 10. By way of example, the tablet device 10B may be any iPad® model available from Apple Inc. A further example of a suitable electronic device 10, specifically a computer 10C, is shown in FIG. 4. FIG. 4 is a front view of the computer 10C representing an example of the electronic device 10. By way of example, the computer 10C may be any MacBook® or iMac® model available from Apple Inc. Another example of a suitable electronic device 10, specifically a watch 10D, is shown in FIG. 5. FIG. 5 includes front and side views of the watch 10D representing an example of the electronic device 10. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 30.

Figure 6:
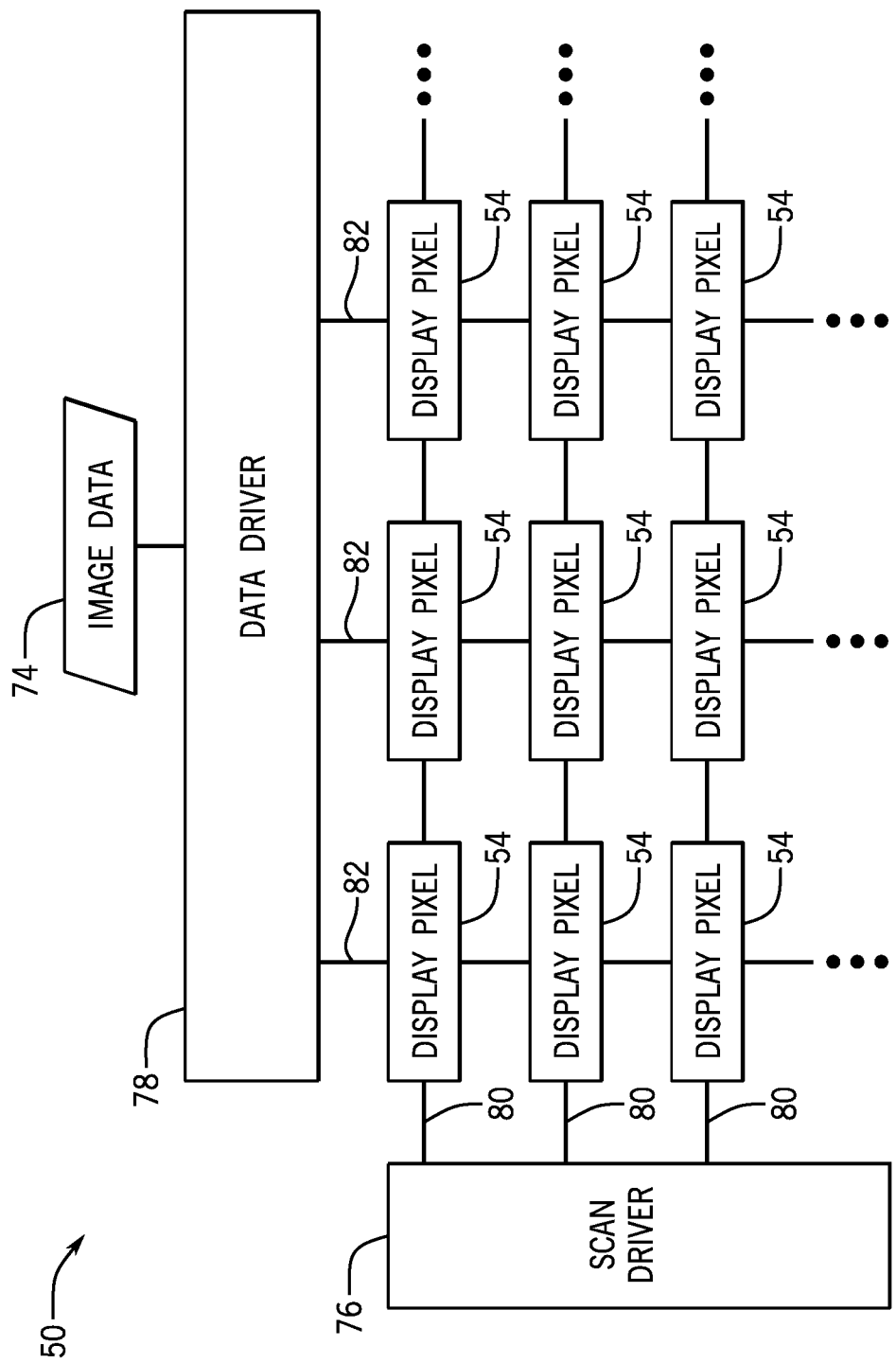
FIG. 6 is a block diagram of a display pixel array of the electronic display of FIG. 1, in accordance with an embodiment.

Keeping the foregoing in mind, FIG. 6 is a block diagram of a display pixel array 50 of the electronic display 12. It should be understood that, in an actual implementation, additional or fewer components may be included in the display pixel array 50.

The electronic display 12 may receive image data 74 for presentation on the electronic display 12. The electronic display 12 includes display driver circuitry that includes scan driver circuitry 76 and data driver circuitry 78. The display driver circuitry controls programing the image data 74 into the display pixels 54 for presentation of an image frame via light emitted according to each respective bit of image data 74 programmed into one or more of the display pixels 54.

The display pixels 54 may each include one or more self-emissive elements, such as a light-emitting diodes (LEDs) (e.g., organic light emitting diodes (OLEDs) or micro-LEDs (μLEDs)), however other pixels may be used with the systems and methods described herein including but not limited to liquid-crystal devices (LCDs), digital mirror devices (DMD), or the like, and include use of displays that use different driving methods than those described herein, including partial image frame presentation modes, variable refresh rate modes, or the like.

Different display pixels 54 may emit different colors. For example, some of the display pixels 54 may emit red (R) light, some may emit green (G) light, and some may emit blue (B) light. The display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use cyan (C), magenta (M), or others.

The scan driver circuitry 76 may provide scan signals (e.g., pixel reset, data enable, on-bias stress) on scan lines 80 to control the display pixels 54 by row. For example, the scan driver circuitry 76 may cause a row of the display pixels 54 to become enabled to receive a portion of the image data 74 from data lines 82 from the data driver circuitry 78. In this way, an image frame of image data 74 may be programmed onto the display pixels 54 row by row. Other examples of the electronic display 12 may program the display pixels 54 in groups other than by row.

Figure 7:
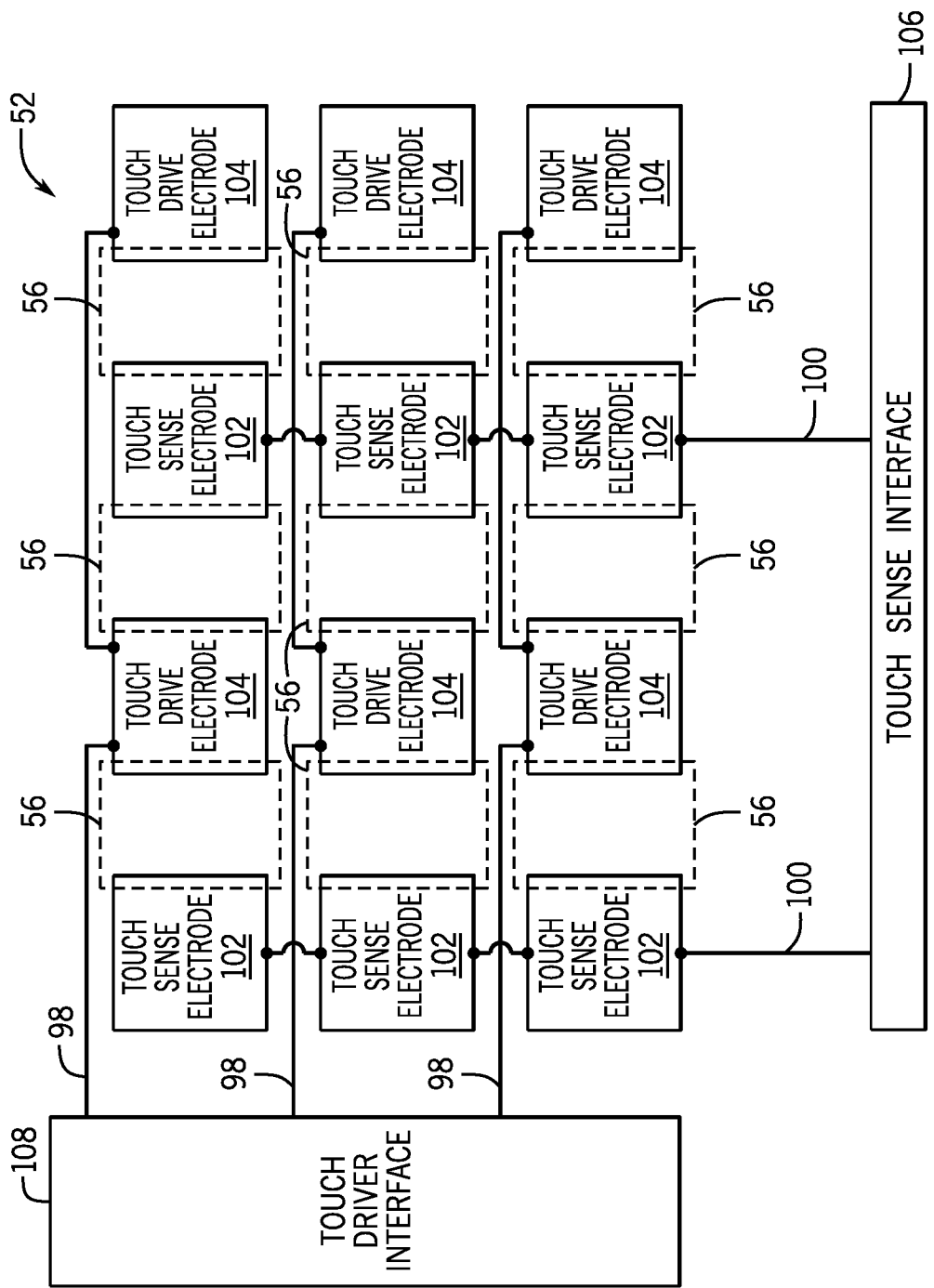
FIG. 7 is a block diagram of a touch sensor array of the electronic display of FIG. 1, in accordance with an embodiment.

The display pixel array 50 operates differently than the touch sensor array 52. Referring now to operations of the touch sensor array 52, FIG. 7 is a block diagram of the touch sensor array 52 of the electronic display 12. The touch sensor array 52 and the display pixel array 50 may be integrated and disposed onto a same component, a silicon chip, a board, or the like.

The touch sensor array 52 includes touch sense regions 56 (e.g., any sized matrix of touch sense regions 56) formed by interactions between touch drive electrodes 104 driven via conductive lines 98 and touch sense electrodes 102 sensed via conductive lines 100. It should be noted that the terms "lines" and "electrodes" as sometimes used herein simply refers to conductive pathways, and are not intended to be limited to structures that are strictly linear. Rather, the terms "lines" and "electrodes" may encompass conductive pathways that change direction or that have different size, shape, materials, or regions. The touch sense electrodes 102 may be sensed along conductive lines 100 by a touch sense interface 106 while different rows of touch drive electrodes 104 are driven with touch drive signals along the conductive lines 98 from a touch driver interface 108.

The touch sense electrodes 102 may respond differently to the touch drive signals based on a proximity of an object, such as a finger, to the touch sense electrodes 102. In this way, the presence of the object may be "seen" in a touch sense region 56 that may result at an intersection of the touch drive electrode 104 and the touch sense electrode 102. That is, the touch drive electrodes 104 and the touch sense electrodes 102 may form capacitive sensing nodes, or more aptly, the touch sense regions 56. The touch sense electrodes 102 and touch drive electrodes 104 may gather touch sense information when operating in what may be referred to herein as a touch mode of operation.

Though the touch sense electrodes 102 and touch drive electrodes 104 may be supplied the same or substantially similar direct current (DC) bias voltage, different alternating current (AC) voltages may be supplied and/or received on touch sense electrodes 102 and touch drive electrodes 104 at substantially different times in some embodiments. For example, as previously noted, the electronic display 12 may switch between two modes of operation: a display mode of operation and the touch mode of operation. Furthermore, in some touch sensor arrays 52, an AC reference voltage is used as a ground for the touch sensing operations associated with the touch sensor array 52.

Figure 8:
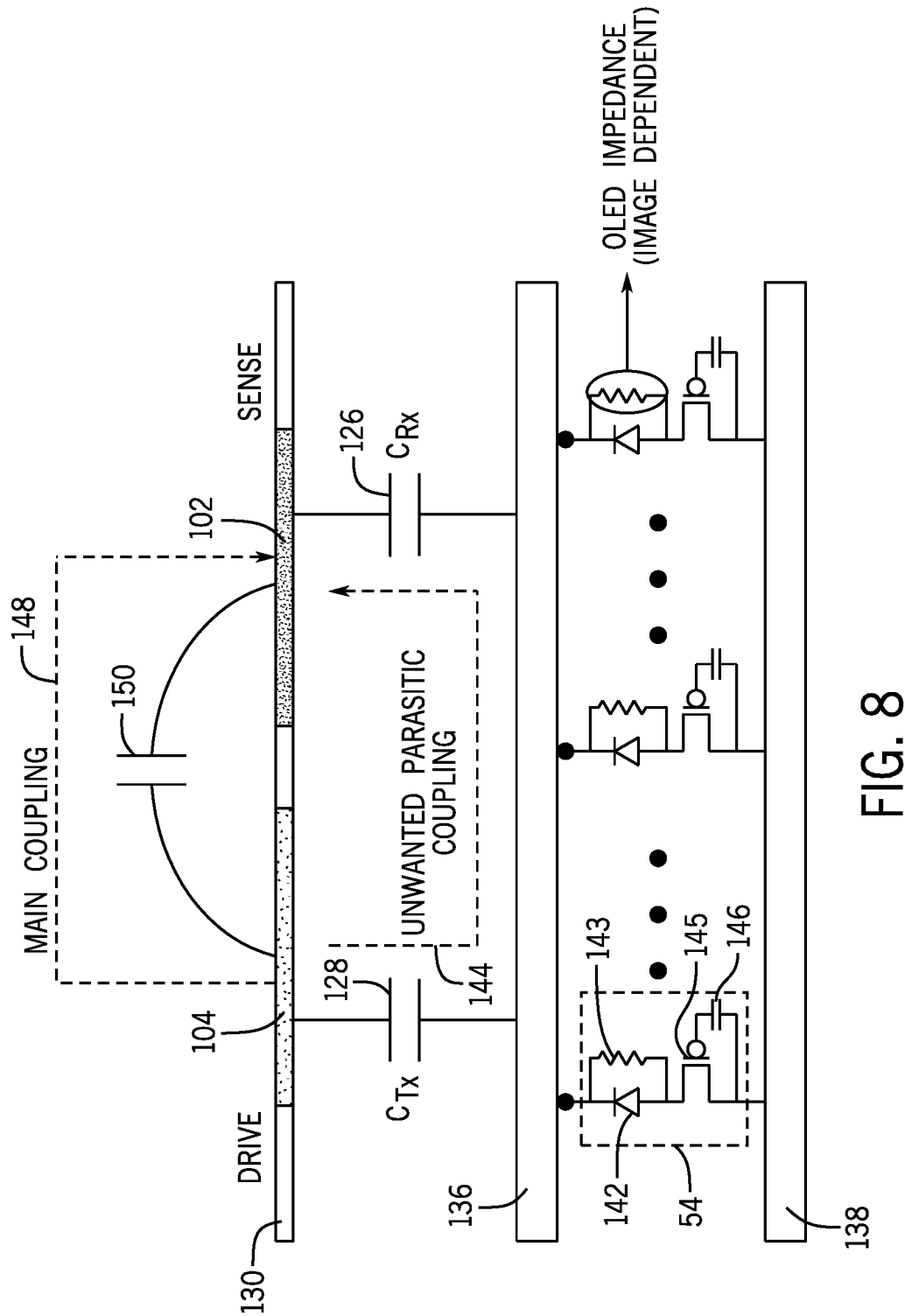
FIG. 8 is a diagrammatic representation of a portion of an electronic display of FIG. 1, in accordance with an embodiment.

As noted above, challenges arise when combining the display pixel array 50 and the touch sensor array 52. To elaborate, FIG. 8 is a diagrammatic representation of a portion of an electronic display 12. A touch layer 130 may include a touch drive electrode 104 and a touch sense electrode 102 in the same spatial plane. A cathode layer 136 may be disposed between the touch layer 130 and a display high voltage supply (ELVDD) layer 138. The cathode layer 136 may couple to the ELVDD layer 138 via display pixels 54. In this example, the display pixels 54 include OLED devices 142, however the display pixels 54 may include any suitable light-emitting device or self-emission component.

Each display pixel 54 may have an impedance 143. The value of the impedance 143 may be image-dependent and may change based on the image data that is currently displayed on the display pixels 54. Previous image data may also affect the value of the impedance 143 (e.g., a hysteresis effect). The impedance 143 may affect values captured via a touch scan of the touch sensor array 52.

Each display pixel 54 may include a capacitor 146 coupled to a gate of a transistor 145. The transistor 145 may be considered a current source. The capacitor 146 may store image data for the display pixel 54. Other circuitry may be included as memory in the pixel, such as one or more back-to-back coupled inverter pairs that form a memory capable of storing multiple bits of image data.

Parasitic capacitances (e.g., parasitic coupling paths 144) may form between the touch layer 130 and the cathode layer 136. The cathode layer 136 may be coupled via undesired parasitic capacitances to the touch drive electrode 104 and the touch sense electrode 102. The parasitic coupling paths 144 may cause sensed capacitance values to change in relation to the noise. For Impedance DTX, parasitic coupling through the cathode layer 136 between the touch drive electrode 104 and the touch sense electrode 102 may change the sensed capacitances, due to changes in settling behavior as at least described in FIG. 9. To elaborate, there may be two signal coupling paths—a main path 148 and the parasitic coupling path 144. The main path 148 signal may transmit from the touch drive electrode 104 and may be coupled to the touch sense electrode 102 via a capacitance 150 being sensed. The parasitic coupling path 144 signal may be transmitted from the touch drive electrode 104 and may couple to the touch sense electrode 102 via the parasitic capacitances 126 and 128. Thus, both the baseline and unwanted signals have a same origin and destination—the difference between the two being the path taken from the touch drive electrode 104 to the touch sense electrode 102. Switching between 100% white image data and 100% black image data may represent extremes of capacitance error due to the parasitic coupling on the touch drive-sense path changing the settling behavior, as at least described in FIG. 9. This resulting error may affect the capacitance that is sensed during touch sensing operations. Thus, compensating for Impedance DTX based on the values of image data may improve the performance of touch sensing operations in the electronic display 12.

Figure 9:
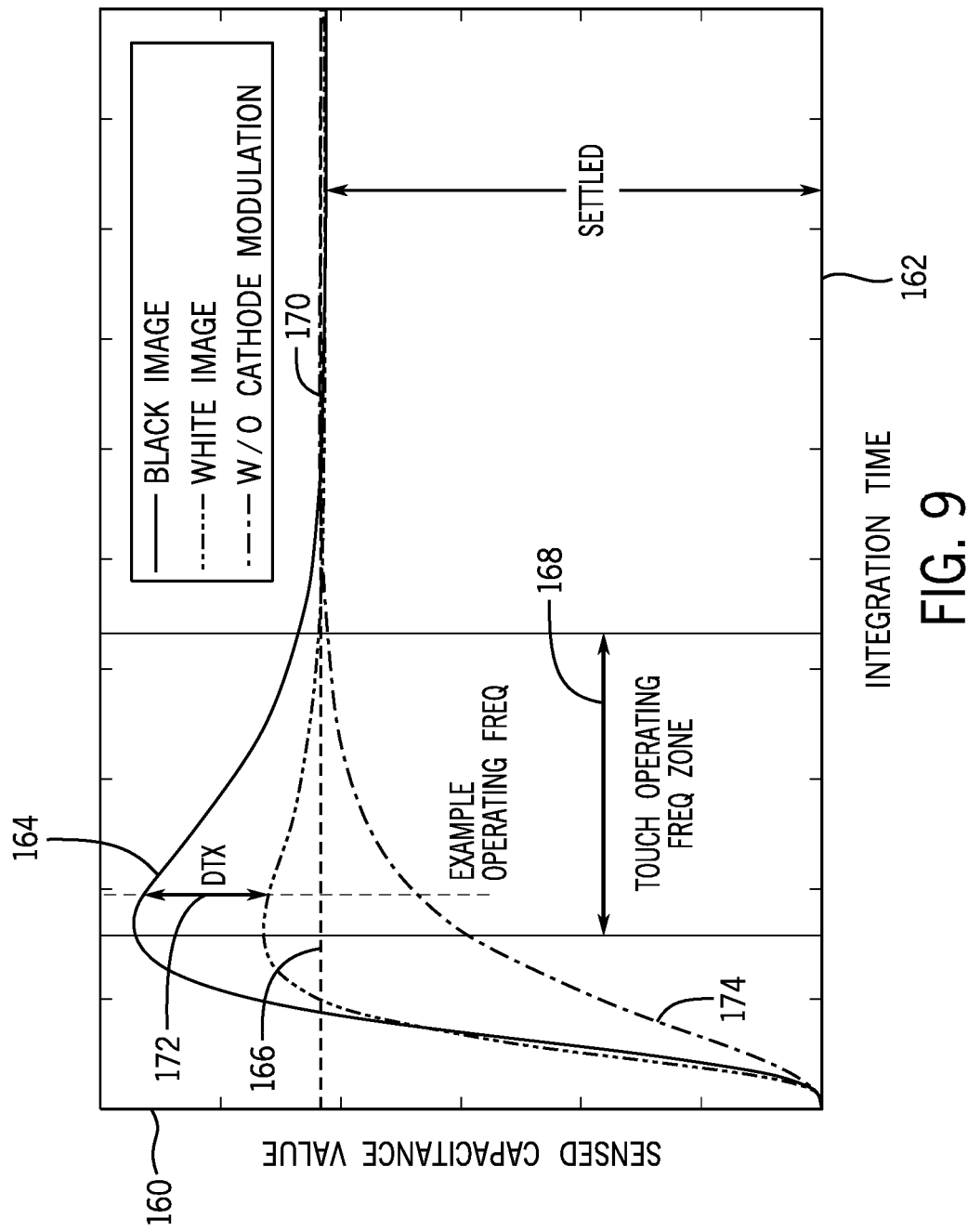
FIG. 9 is a plot comparing capacitances sensed during an image presentation, in accordance with an embodiment.

A particular example appears in FIG. 9, which shows a plot of capacitances sensed by a touch subsystem while different images are presented by a display subsystem. The plot compares sensed capacitance values (axis 160) to integration time (axis 162). Curve 164 corresponds to data simulating presentation of a 100% black image, curve 166 corresponds to data simulating presentation of a 100% white image, and curve 174 corresponds to data simulating sensed capacitance value over time without cathode modulation (e.g., baseline capacitance values). Over time and after integration time period 168, which corresponds to times during which the capacitance may be sensed by the touch subsystem, capacitance values settle to level 170. Integration time (axis 162) may span microseconds, such as between 0 microseconds and 5 microseconds, between 0 microseconds and 10 microseconds, or the like. Sensed capacitance values may span between 0 femtofarads to 1200 femtofarads, between 0 femtofarads to 1400 femtofarads, or the like. Before settling, the capacitance values overshoot and the amount of overshoot is image dependent. The amount of overshoot also may limit a maximum touch operating frequency that can be used. When touch sensing operations are performed before the capacitance value settles, capacitances sensed during the touch sensing operations may be affected by the Impedance DTX. The Impedance DTX may be represented by a difference 172 in capacitance sensed when sending the low gray level image (e.g., 100% black image data) and in capacitance sensed when sending the high gray level image (e.g., 100% white image data). Thus, compensating the sensed capacitance to account for the parasitic capacitance based on the values of image data may mitigate the Impedance DTX.

Figure 10:
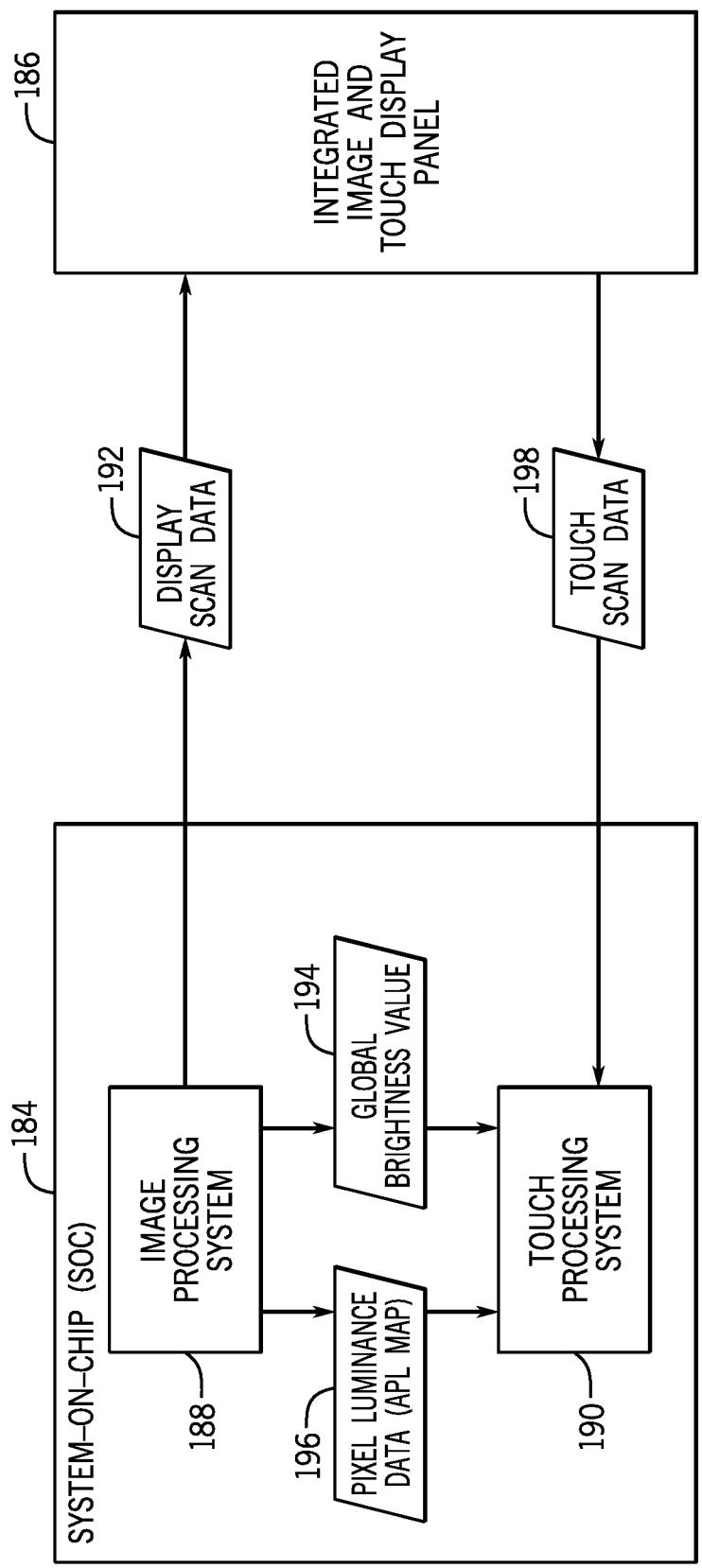
FIG. 10 is a block diagram of a portion of the electronic device of FIG. 1 including a touch processing system, in accordance with an embodiment.

To do so, an electronic device 10 may determine (e.g., estimate) the amount of Impedance DTX and use the amount to remove the capacitance error from the touch scan data. To elaborate, FIG. 10 is a block diagram of an electronic device 10. The electronic device 10 includes a system-on-a-chip (SOC) 184 and an integrated image and touch display 186. The SOC 184 may include an image processing system 188 and a touch processing system 190. The image processing system 188 may receive image data and generate display scan data 192 based on image processing operations and a global brightness value 194.

The global brightness value 194 may refer to an input received via manual or automated controls to brighten or dim the electronic display 12 perceived brightness at a global or display-panel wide adjustment level. The global brightness value 194 may be associated with a defined gray level to luminosity relationship to associate a numerical gray level to a resulting light intensity emitted from the electronic display 12. For example, the global brightness value 194 may reduce a luminosity of a 255 gray level such that a pixel driven with image data indicating a 255 gray level actually emits at a 50% of maximum intensity. Indeed, the global brightness value 194 may trigger a image frame-wide brightness adjustment for a brightness permitted at a maximum gray level value.

The display scan data 192 may include (e.g., be generated based on) indications of pixel luminance data 196, such as indications of gray levels at which to operate one or more of the display pixels 54 of the integrated image and touch display 186 transmitted as part of an average pixel luminance map (APL map). The integrated image and touch display 186 may incorporate the touch sensor array 52 from FIG. 7 and the display pixel array 50 from FIG. 6 into a single substrate device, a single system on a chip, an integrated package die, or other suitable integrated panel structure. In some systems, the image processing system 188 may use one or more display pipelines, image processing operations, or the like, when processing the image data to generate the display scan data 192. The image processing system 188 may transmit the pixel luminance data 196 and the global brightness value 194 to the touch processing system 190.

The integrated image and touch display 186 may use the display scan data 192 when generating control signals to cause the display pixels 54 to emit light. It may be desired for touch sensing operations to occur substantially simultaneous or perceivably simultaneously to the presentation of the image frames via the integrated image and touch display 186. The touch sensing operations may generate touch scan data 198, which the integrated image and touch display 186 may transmit to the touch processing system 190. To compensate for Impedance DTX, the touch processing system 190 may use the pixel luminance data 196 and the global brightness value 194 to determine an amount of sensed capacitance contributed from the Impedance DTX (e.g., to estimate the amount, to calculate the amount). The touch processing system 190 may then adjust the touch scan data 198 based on the determined amount of capacitance contributed from the Impedance DTX to compensate for the Impedance DTX.

In some systems, the pixel luminance data 196 may be averaged. Furthermore, the display scan data 192 and/or the touch scan data 198 may be handled on a row-by-row basis of a pixel map, such as a two-dimensional (2D) map (e.g., a vector of a computational matrix).

Figure 11:
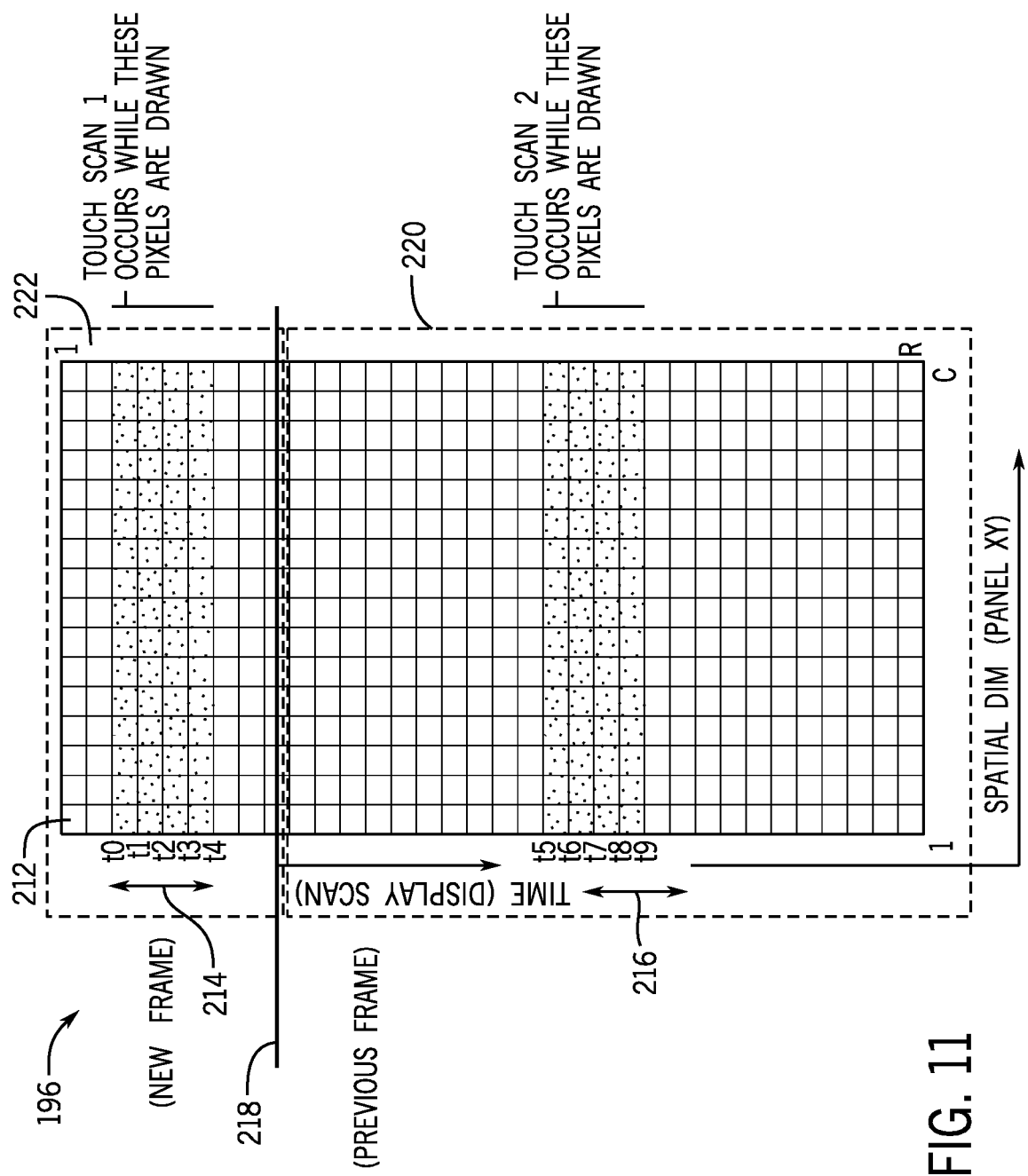
FIG. 11 is a diagrammatic representation of a pixel map processed by the touch processing system of FIG. 10, in accordance with an embodiment.

To elaborate, FIG. 11 is a diagrammatic representation of the pixel luminance data map (APL map) 196, which may describe the average pixel luminance of different regions of the electronic display 12, shown as cells 212. An image frame may be divided into the various cells 212. Image data processed by the image processing system 188 may be converted into grey level values, which may be used to determine a metric of luminance. The image processing system 188 may calculate luminance data, or may use another type of data similarly indicative of current in display pixels 54, and may use the calculated data to predict parasitic capacitances expected to affect touch scan data while the image frame is presented.

Since a display pixel 54 may emit a more intense light when driven with larger current signals, current signals may relate to luminance values emitted from the display. Values of the current signals may be determined from a function that relates the global brightness value 194, the image data for a respective display pixel 54, and any other suitable data to a current signal to use to drive the display pixel 54 to emit light at the desired gray level. This function may include constants specifically selected for the display pixel 54, and thus may be considered a per-pixel function. When the values of the current signals are averaged, the resulting value may indicate an average luminance of light to be emitted by the display pixels 54 associated with a cell 212. The averaged current values may indicate a contribution from the image frame presentation to errors (e.g., Impedance DTX) affecting a touch sensing operation.

Another way that the image processing system 188 may predict the parasitic capacitance may be to determine the average pixel luminance values (APL data) of the APL map 196 based on the image data. Taking the average pixel luminance values, the touch processing system 190 may use the APL map 196 and the global brightness value 194 to determine an expected amount of Impedance DTX corresponding to respective pixel luminances. Impedance DTX may be a function of pixel currents and the pixel currents may be a function of the pixel luminances, thus direct determination of current values may be bypassed. In some cases, a lookup table may index APL data and display brightness values to an amount of correction to apply to touch scan data to compensate for the Impedance DTX.

The cells 212 may form an iso-grid, two-dimensional matrix of values corresponding to display locations on the integrated image and touch display 186, and it should be understood that different dimensions may be used for different cells 212 in some cases. The pixel luminance data 196 may be updated and/or transmitted to the touch processing system 190 line-by-line, cell-by-cell, pixel-by-pixel, or using any transmission pattern based on the display scan data 192. Shown with the pixel luminance data 196 are indications of when touch sensing operations occur relative to the cells 212. The touch sensing operations, a touch scan, may be performed at times t0-t4 (e.g., range 214) and again at times t5-t9 (e.g., range 216) overlapping to when the integrated image and touch display presents one or more image frames. To save power, if desired, compensation operations may not be performed between the t4-t5 times when a touch scan is not performed. A line 218 may represent a boundary or transition between cells 212 having values corresponding to a previous image frame (e.g., represented by cell group 220) and the cells 212 having values corresponding to a current image frame (e.g., represented by cell group 222) associated with the display scan data 192. The touch processing system 190 may use the pixel luminance data 196 to compensate for Impedance DTX based on the operations of FIGS. 12 and 13.

Figure 12:
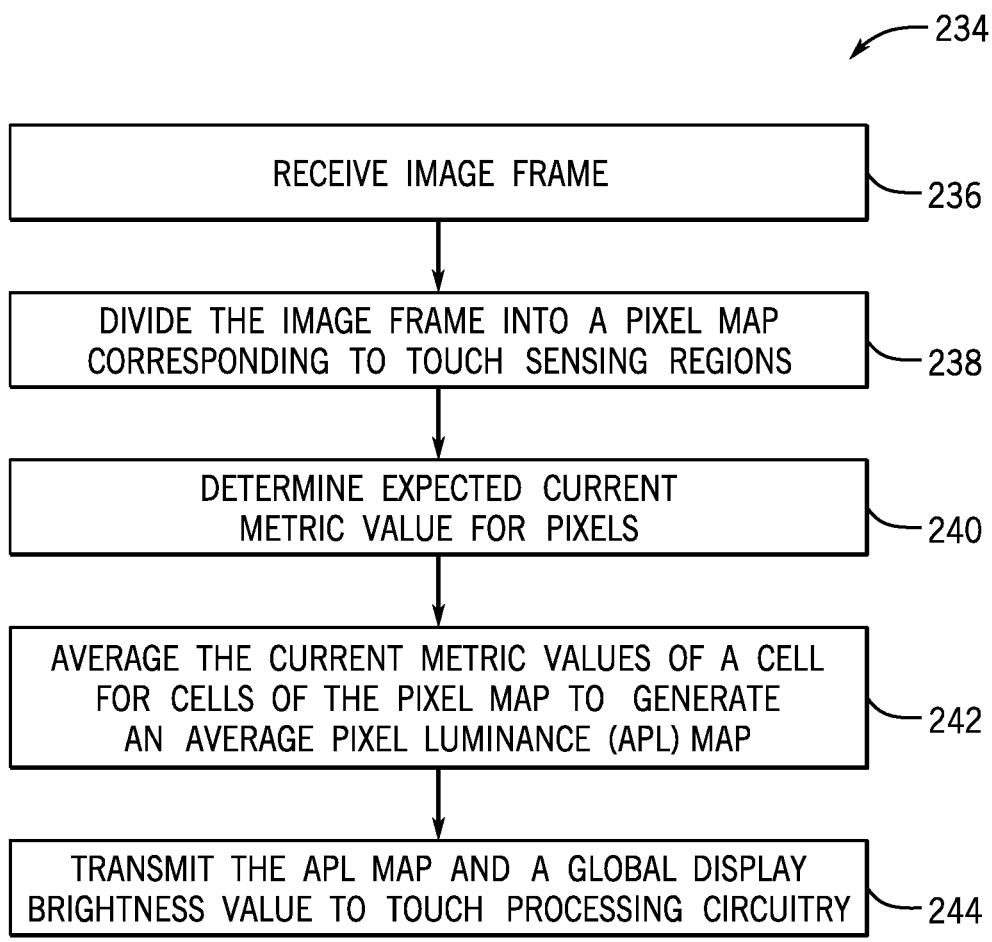
FIG. 12 is a flowchart of a process for operating image processing circuitry to generate data used by the touch processing system of FIG. 10 to compensate for Impedance DTX, in accordance with an embodiment.

FIG. 12 is a flowchart 234 illustrating a process for generating data used by the touch processing system 190 for compensating for Impedance DTX. Although certain operations of the flowchart 234 are presented in a particular order in FIG. 12, it should be understood that additional or fewer operations may be used in a same or different operational order than that presented below. Furthermore, although described herein as performed by the image processing system 188, it should be understood that other circuitry may perform some or all of the operations described herein.

At block 236, the image processing system 188 may receive an image frame generated by any suitable image frame or image data generation process. The image processing system 188 may generate the image frame based on indications of user inputs, programmed operations, or the like. Sometimes, the image processing system 188 may retrieve the image frames from memory. For example, image frames may have been previously generated by an image source and stored in memory for access by the image processing system 188.

At block 238, the image processing system 188 may divide the image frame into cells 212. The cells 212 may correspond to touch sensing regions 56 of the integrated image and touch display 186. There may be the same or a different number of cells than a 1:1 association to the touch sensing regions 56.

At block 240, the image processing system 188 may determine an expected current metric value for the display pixels 54. A suitable current metric value may be any value associated with operation of the display pixel 54 that may be corresponded to a current of the display pixel 54, including voltages over different portions of the display pixel 54, driving signals transmitted to the display pixels 54 and corresponding to image data, gray level values used to generate the driving signals for the display pixels 54, or the like. The image processing system 188 may process the image data corresponding to the display pixels 54 to determine the expected current metric values. In this example, the image processing system 188 uses luminance value, or gray level, as a proxy value for a current associated with the display pixel 54.

At block 242, the image processing system 188 may average the current metric values associated with a cell 212 for the cells 212 to generate the average pixel luminance (APL) map 196. Current metric values may indicate what pixel currents are expected to be while presenting the image data at the global brightness value 194. The global brightness value 194 may be a display brightness value (DBV) representative of a luminance adjustment applied to image data of the image frame as a whole. The DBV may be received based on user input to select between ranges of display brightness values. For example, for image data equal to 255, at a DBV=0% a current drawn may be almost zero but at a DBV=50% may be greater than zero. A current metric value may indicate a pixel luminance value, which may be averaged over the cells 212 to generate the APL map 196. The pixel luminance value may be considered a per-component value and/or a weighted average value. The pixel luminance value may be based on all color components of a respective data value presented via various sub-pixels of a display pixel 54. That calculation may be repeated to generate the APL map 196, such as for each cell 212 of the cells 212. A lookup table may associate image data values and the global brightness value 194 to current metric values. Interpolation between values in the lookup table may obtain current metric values for image data not included in the lookup table. The averaged gray level values, or other suitable average or non-average current metric values, may be transmitted as the APL map 196 to the touch processing system 190.

Thus, at block 244, the image processing system 188 may transmit the APL map 196 and a global brightness value 194 to the touch processing system 190. When transmitting the APL map, the image processing system 188 may transmit the APL map 196 line-by-line, cell-by-cell, pixel-by-pixel, or using any transmission pattern to the touch processing system 190 to transition incrementally between an old image frame and a new image frame. The image processing system 188 may also transmit the display scan data 192 to the integrated image and touch display 186 in a similar line-by-line, cell-by-cell, pixel-by-pixel, or transmission pattern. In some cases, the image processing system 188 also transmits timing information to the integrated image and touch display 186, which may permit the touch processing system 190 to synchronize its processing of touch scan data 198 to the image presented.

Figure 13:
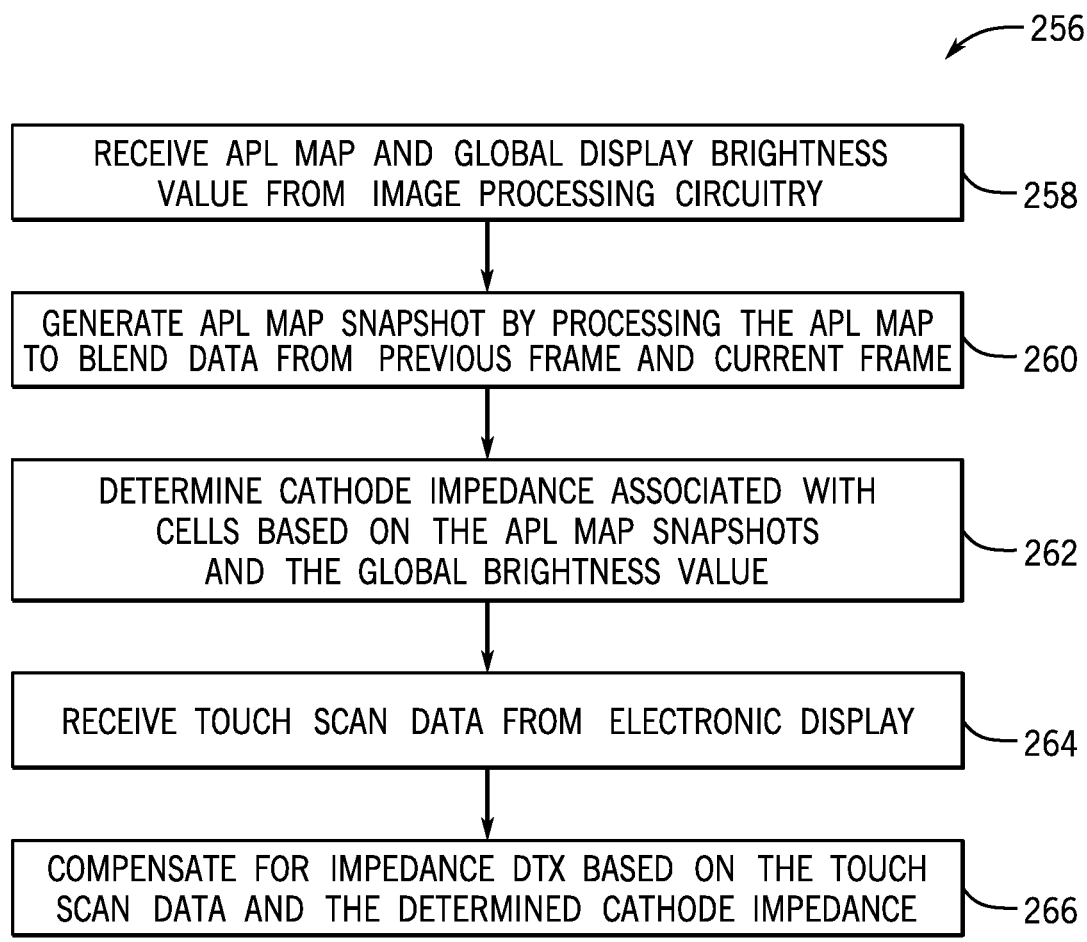
FIG. 13 is a flowchart of a process for operating touch processing circuitry of FIG. 10 to estimate an amount of Impedance DTX to use when compensating touch scan data, in accordance with an embodiment.

After receiving the APL map 196, the touch processing system 190 may estimate a cathode current to use to compensate for Impedance DTX. FIG. 13 is a flowchart 256 illustrating a process for estimating cathode currents to compensate for Impedance DTX based on the APL map 196. Although certain operations of the flowchart 256 are presented in a particular order in FIG. 13, it should be understood that additional or fewer operations may be used in a same or different operational order than that presented below. Furthermore, although described herein as performed by the touch processing system 190, it should be understood that other circuitry may perform some or all of the operations described herein.

At block 258, the touch processing system 190 may receive one or more rows of the APL map 196 and the global brightness value 194 of the image processing system 188. At block 260, the touch processing system 190 may generate an APL map 196 snapshot by blending data from a previous image frame and the one or more rows of the APL map corresponding to the current image frame. Referring to FIG. 11, line 218 represents where the blending between data corresponding to a previous image frame (e.g., represented by cell group 220) and data corresponding to a current image frame (e.g., represented by cell group 222).

At block 262, the touch processing system 190 may determine a cathode impedance associated with the cells 212 based on the APL map 196 snapshots and the global brightness value 194. To do so, the touch processing system 190 may apply APL values of one or more of the cells 212 and the global brightness value 194 to a function to determine a respective cathode impedance or a contribution to the overall cathode impedance. The function may be generated based on a training algorithm that uses training sets of images to estimate Impedance DTX. A physics model may be used to generate the function to determine Impedance DTX resulting from test image data. After the physics model is generated, the model may be parameterized to determine variables and a function to later be applied based on or using the APL values of one or more of the cells 212 and the global brightness value 194. In some cases, a look up table may relate the APL values of one or more of the cells 212 and/or the global brightness value 194 to an expected cathode impedance. In some cases, a deep neural network, a connected neural network, machine learning-techniques, or the like may be used to generate the function for determining the cathode impedance.

At block 264, the touch processing system 190 may receive the touch scan data 198 from the integrated image and touch display 186. The touch scan data 198 may include indications of sensing capacitance based on signal interactions between the touch drive electrode 104 and the touch sense electrode 102 of FIG. 8 during a touch scan operation.

After receiving the touch scan data 198 and determining the cathode impedance, at block 266, the touch processing system 190 may compensate for Impedance DTX based on the touch scan data 198 and the determined cathode impedance. To compensate, the cathode impedance may be subtracted from the touch scan data 198 or otherwise used to compensate for the Impedance DTX.

Figure 14:
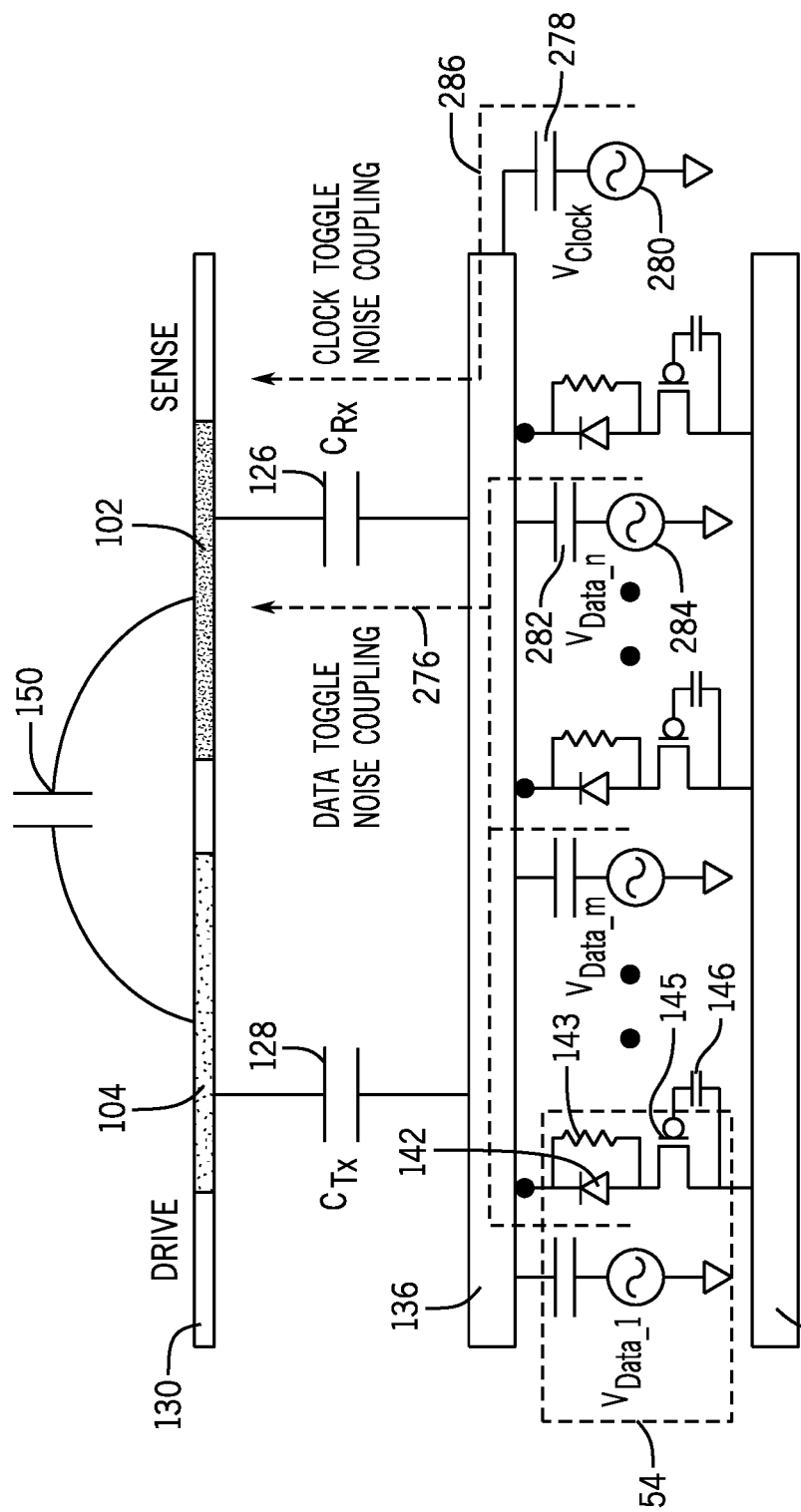
FIG. 14 is a diagrammatic representation of a portion of the display of FIG. 1, in accordance with an embodiment.

Image data may also be used to compensate for Switching DTX. FIG. 14 is a diagrammatic representation of a portion of the electronic display 12. In Switching DTX, data coupling paths 276 and clock coupling paths 286 may form between the touch sense electrode 102 and a cathode layer 136. The data coupling paths 276 and clock coupling paths 286 may transmit noise from the operations. The noise from the data transmission via data coupling paths 276 may have greater magnitudes than noise from clock transmission via clock coupling paths 286, and thus compensation for the data transmission may improve performance of touch sensing operations in the electronic display 12.

Figure 15:
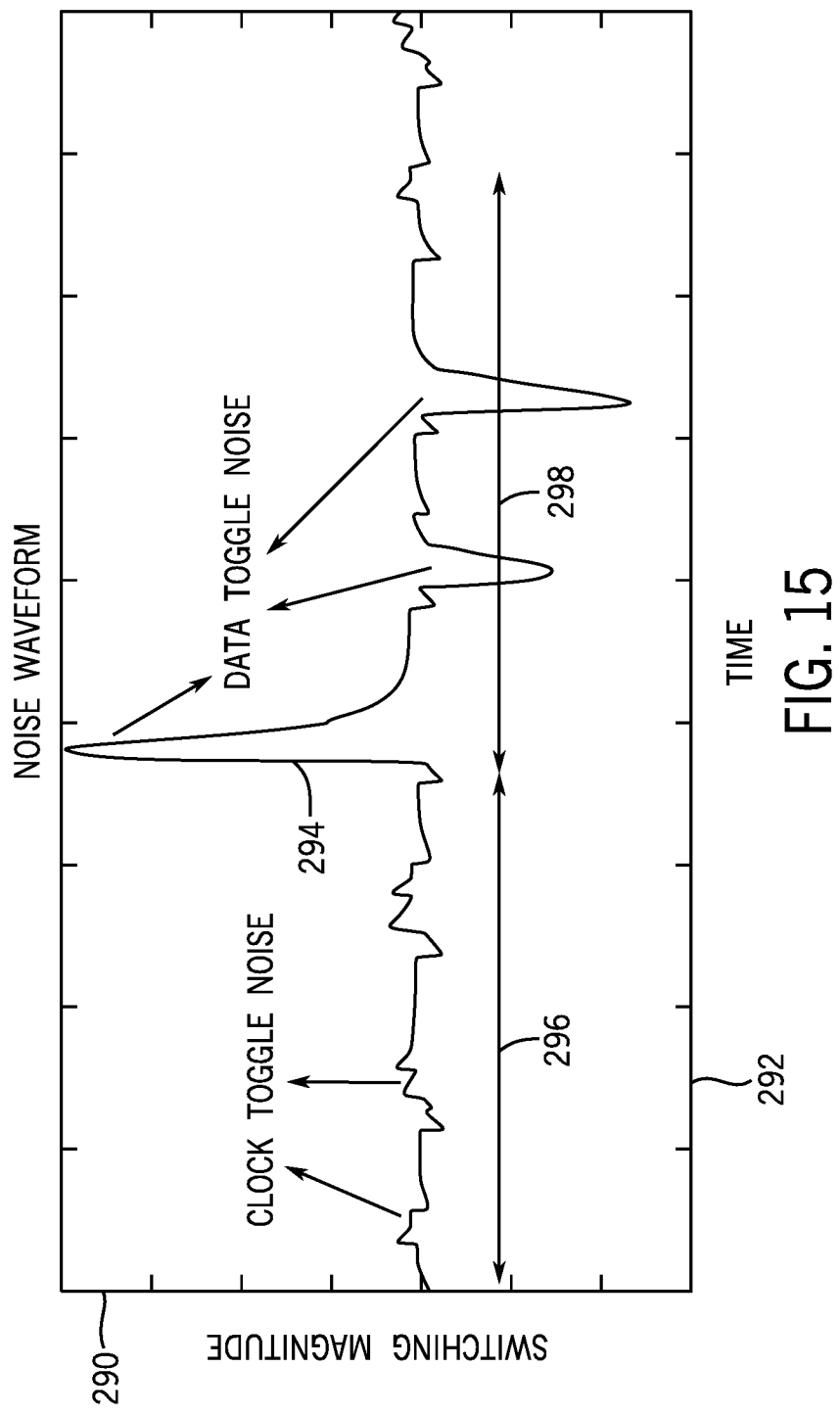
FIG. 15 is a plot comparing noise sensed over time during presentation of image data, in accordance with an embodiment.

To elaborate, FIG. 15 is a plot comparing noise over time while an image is presented. The plot compares noise values (axis 290) to time (axis 292). Line 294 corresponds to data simulating touch scan data before and after presenting image data. Before the image data is transmitted, noise on the touch scan data may be attributed to clock toggle noise (e.g., duration 296 of line 294). Image data transmission may introduce data toggle noise on the touch scan data (e.g., duration 298 of line 294). Knowledge of image content may be used to algorithmically remove the Switching DTX from the touch scan data 198.

Figure 16:
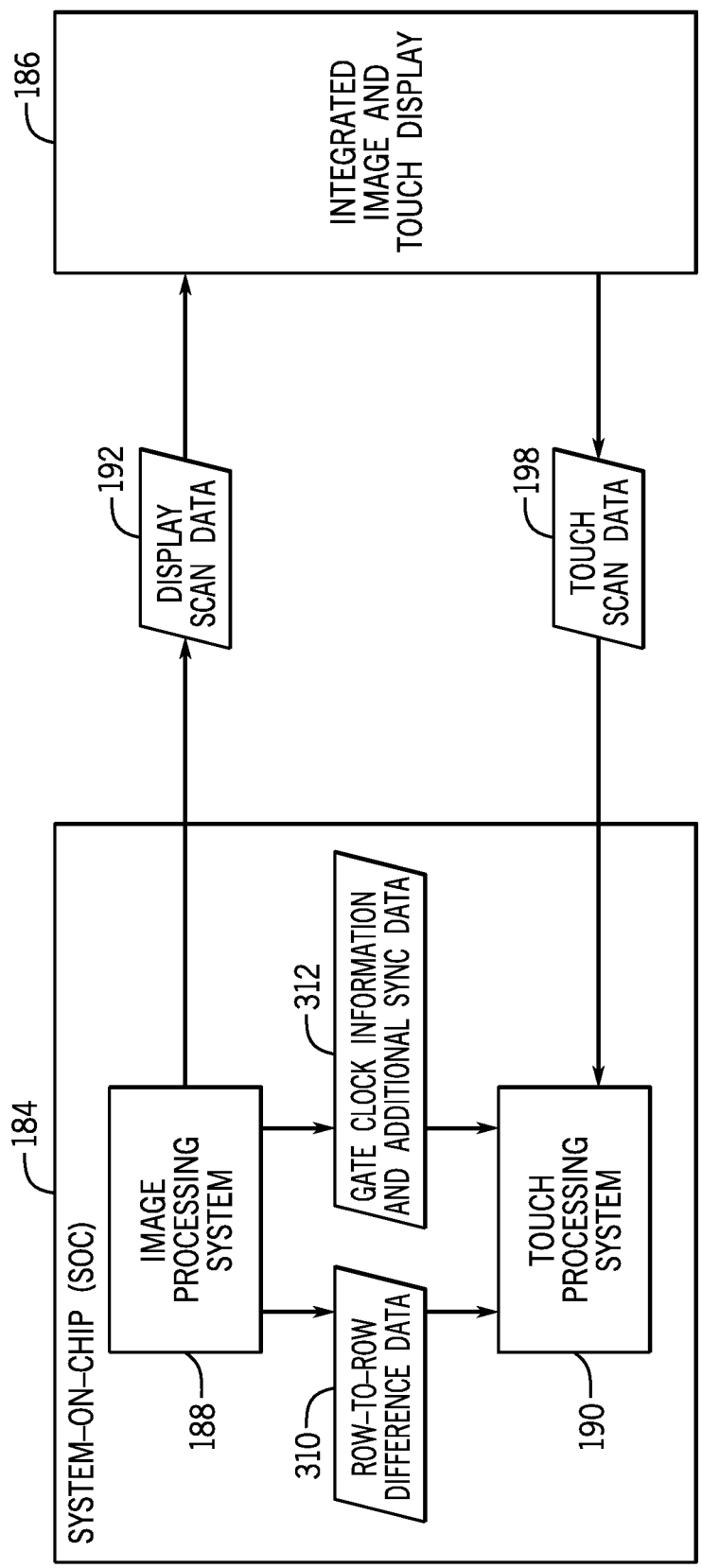
FIG. 16 is a block diagram of a portion of the electronic device of FIG. 1, in accordance with an embodiment.

To do so, the electronic device 10 may determine or estimate the amount of Switching DTX and use the amount to remove the capacitance noise from the touch scan data 198. To elaborate, FIG. 16 is a block diagram of the electronic device 10. The image processing system 188 may receive image data and generate display scan data 192 based on image processing operations. The image processing system 188 based on the display scan data 192 may generate and transmit row-to-row difference data 310 and sync information 312 to the touch processing system 190. The sync information 312 may include gate clock information and/or additional data useful for compensating Switching DTX. The touch processing system 190 may receive touch scan data 198 and may calculate noise contribution from Switching DTX based on the row-to-row difference data 310 and sync information 312. To compensate for the Switching DTX, the touch processing system 190 may adjust the touch scan data 198 using the calculated noise contribution to mitigate perceivable effects of the Switching DTX.

Figure 17:
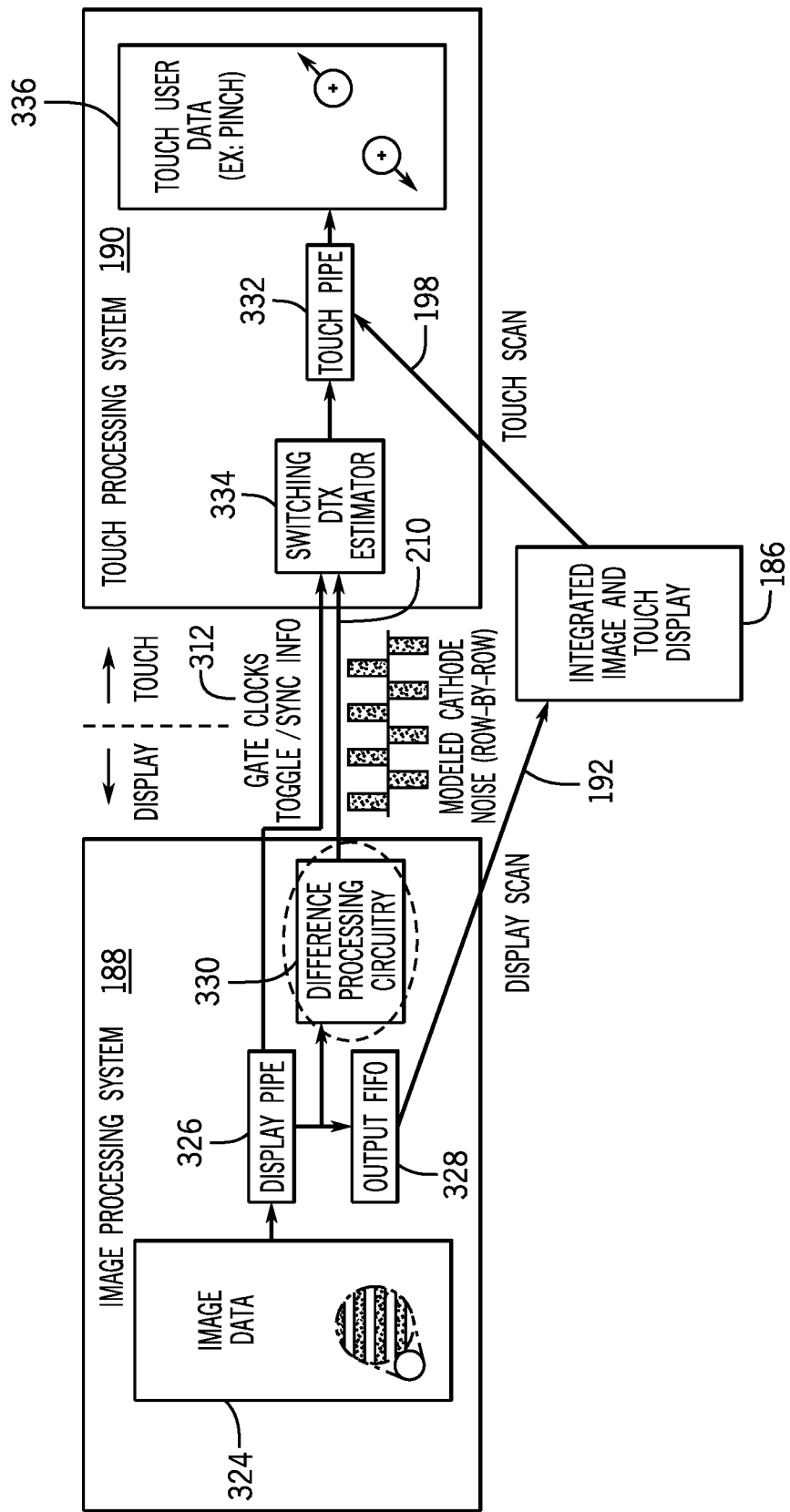
FIG. 17 is a diagrammatic representation of operations of the portion of the electronic device of FIG. 16 used to mitigate the Switching DTX, in accordance with an embodiment.

In some systems, the image processing system 188 may reduce the image data received into a vector representation of row-by-row differences in voltage values (e.g., signed voltage amplitude data). To elaborate, FIG. 17 is a diagrammatic representation of operations of the electronic device 10 to mitigate Switching DTX. Image data 324 may be received by the image processing system 188. Relatively noisy data is shown here as the image data 324 (e.g., alternating rows of black and white image data, high contrast image data) but any suitable image data 324 may be benefit from Switching DTX compensation. A display pipeline 326 of the image processing system 188 may generate the display scan data 192 based on the image data 324, which may transmit via an output first-in, first-out buffer 328 to the integrated image and touch display 186. The display pipeline 326 may transmit the sync information 312 and gate clocking signals (e.g., information) directly to the touch processing system 190. While the integrated image and touch display 186 is preparing and transmitting the touch scan data 198, difference processing circuitry 330 may use the image data 324 to generate the row-to-row difference data 310. The difference processing circuitry 330 may transmit the row-to-row difference data 310 to the touch processing system 190. The touch processing system 190 includes a Switching DTX estimator 334 and a touch processing pipeline 332. The Switching DTX estimator 334 may use the row-to-row difference data 310 to estimate noise affecting the touch scan data 198. Using the row-to-row difference data 310 and the sync information 312, the touch processing system 190 may process the touch scan data 198 and generate the touch user data with mitigated or relatively improved touch user data 336 that may have a lower noise contribution from Switching DTX.

Figure 18:
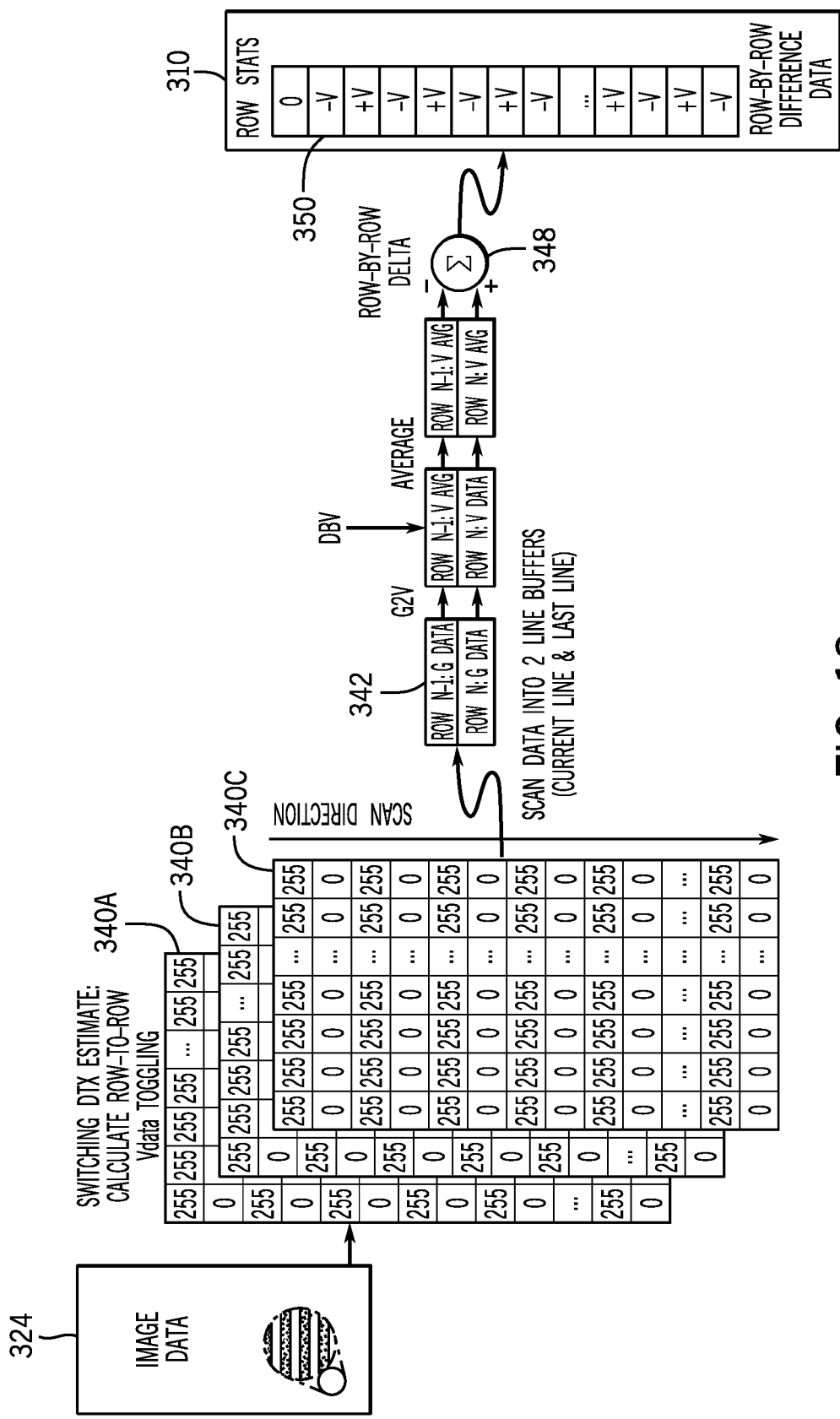
FIG. 18 is a diagrammatic representation of operations performed by difference processing circuitry of FIG. 17 on received image data, in accordance with an embodiment.

FIG. 18 is a diagrammatic representation of operations performed by the difference processing circuitry 330 on received image data 324 (e.g., display scan data). The difference processing circuitry 330 may process the image data 324 to calculate an indication of row-to-row voltage data toggling. To do so, a sub-frame of image data 324, that is a color component of the image frame data, may be converted from gray level data to voltage data using grey-to-voltage conversion operations. A first color component may correspond to a red data sub-frame 340A, a second color component may correspond to a green data sub-frame 340B, and a third color component to a blue data sub-frame 340C. The color components 340 may be respective output to dual buffers 342, a first buffer may be used for a previous row and a second buffer for a current row. This may change a binary signal indicative of a gray level value into a voltage signal having a voltage level corresponding to the gray level value that may be used to cause the display pixel 54 to emit light at a brightness level corresponding to the gray level value. When multiple voltage signals of a same row of image data are considered, these values may be averaged on the row. These values may be averaged before or after conversion from gray level data to voltage data or voltage signals. In addition to averaging over the row, there may another level of averaging—that is, going from three-dimensions of color data to a single average value over the different color data (e.g., R data, G data, and B data being averaged to a single value). The averaging over the three-dimensions of color data may be done before or after conversion from gray level data to voltage data and before or after averaging over the row of data. Converting the gray level data to voltage data or voltage signals after averaging may result in further power consumption reductions, and thus further improved device operations. Each row average may then be considered relative to a previous row and a next row to identify two differences for a single current row. By applying the difference processing to multiple rows, the difference processing circuitry 330 may generate the row-to-row difference data or downstream transmission and processing.

As an example, rows of data may be loaded into the buffers 342. The buffers 342 may include a previous row (row n−1) and a current row (row n). The row data stored in the buffer 342 may be converted from gray level data into the voltage data or indications of voltage data as part of a gray-to-voltage (G2V) conversion operation. This conversion may use a display brightness value (DBV) of sync information 312. The values of the row in the voltage domain may be consolidated by averaging among the values of the rows to generate a single value for each of the buffers 342. A difference comparator 348 may determine a difference in value between the averages of each of the buffers 342. This difference may be stored in a vector matrix 350 for use by the touch processing system 190 in compensating for Switching DTX.

Figure 19:
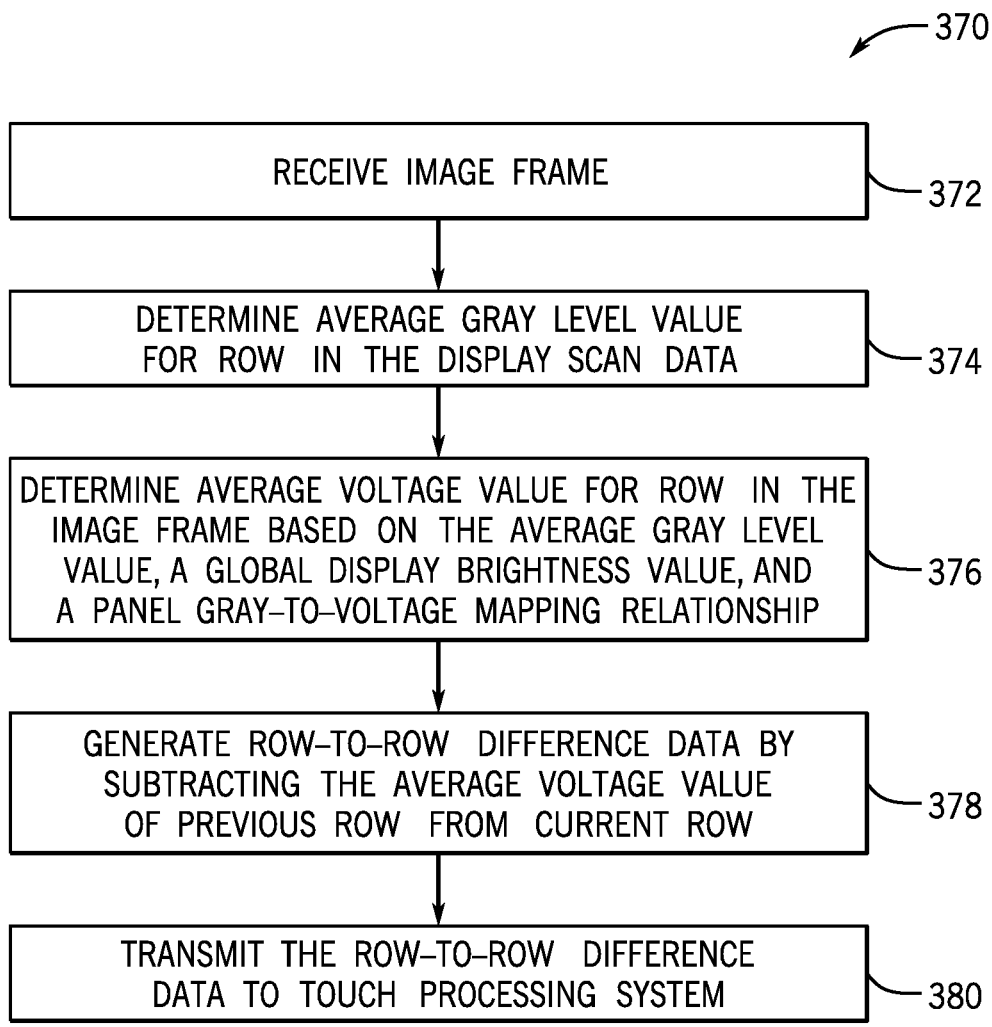
FIG. 19 is a flowchart of a process for operating image processing circuitry to generate data used by the touch processing system of FIG. 16 to compensate for Switching DTX, in accordance with an embodiment.
Figure 20:
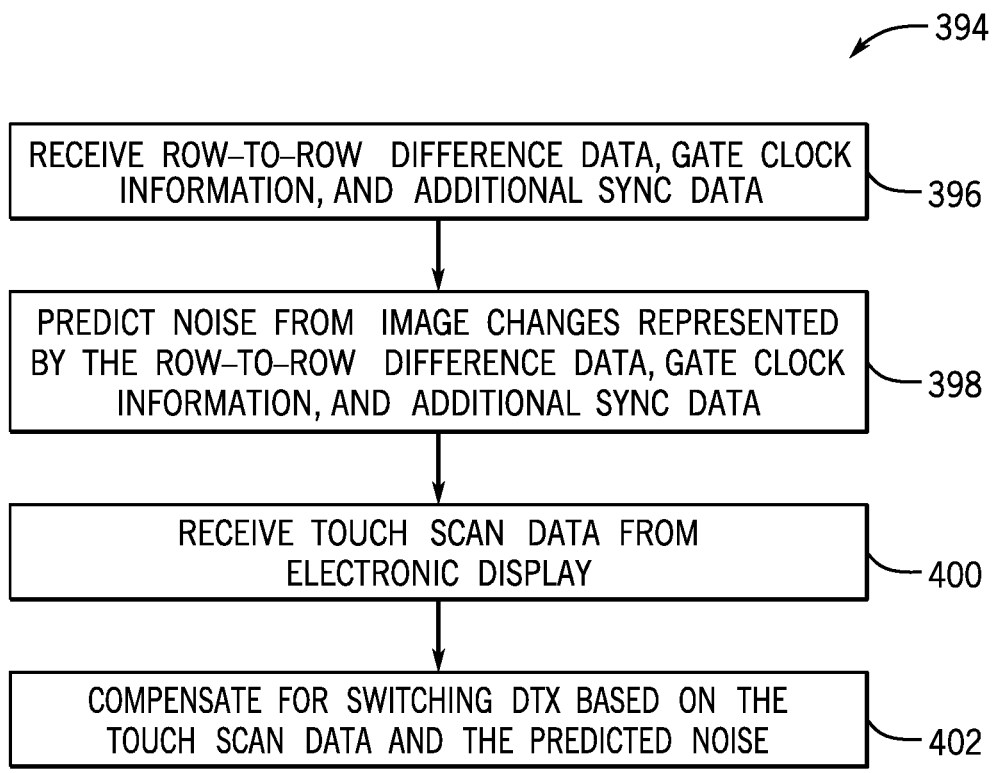
FIG. 20 is a flowchart of a process for operating touch processing circuitry of FIG. 16 to estimate an amount of Switching DTX to use when compensating touch scan data, in accordance with an embodiment.

These operations may be summarized in FIGS. 19 and 20. FIG. 19 is a flowchart 370 illustrating a process for generating data used by the touch processing system 190 for compensating for Switching DTX. Although certain operations of the flowchart 370 are presented in a particular order in FIG. 19, it should be understood that additional or fewer operations may be used in a same or different operational order than that presented below. Furthermore, although described herein as performed by the image processing system 188, it should be understood that other circuitry may perform some or all of the operations described herein.

At block 372, the image processing system 188 may receive an image frame generated by any suitable image frame or image data generation process. The image processing system 188 may generate the image frame based on indications of user inputs, programmed operations, or the like. Sometimes, the image processing system 188 may retrieve the image frames from memory, such as image frames previously generated by an image source and stored in memory for access by the image processing system 188.

At block 374, the image processing system 188 may determine an average gray level value for a row in the display scan data 192. Each row of image data may be averaged in an image frame. Sometimes groups of rows may be averaged or less than each row may be averaged for a given image frame. Thus, the image processing system 188 may average the image data prior to converting the gray level data from the image data 324 into the voltage signals. In some embodiments, the gray level values may first be converted into data voltages or other pixel luminance metrics before averaging operations of block 374, such that subsequent data processing is based on indications of voltage signals or current signals When the row data is averaged, at block 376, the image processing system 188 may determine an average data voltage value for a row in the image frame based on the average gray level values, a current display brightness value, and a panel gray-to-voltage mapping relationship. The average gray level data may be converted into voltage values (e.g., voltage signal, voltage data) using a mapping function indicative of a pixel current-voltage relationship that associates a respective gray level to a respective output voltage to use to generate a current to cause a display pixel 54 to emit light at the respective gray level. The mapping function may use a variety of values as input constants or variables including the average gray level values, the current display brightness value (e.g., global brightness value affecting the whole display), or other suitable values that may affect a display pixel 54 emissive characteristics. The mapping function may be a same function for each pixel of the electronic display 12, and may match the function used to convert image data to luminance data when determining Impedance DTX, such as at block 240 or block 242. The SOC 184 may use different mapping functions for different regions of the electronic display 12 and the regions may take any geometric shape, such as row regions, column regions, square regions, circular regions, or non-geometric shapes. The mapping functions may define a relationship between voltage data and resulting gray level emissivity of the electronic display 12 and may be parametrized using a global display brightness value 194, gray level values, and voltage data. To generate a mapping function, input test data may be used to drive the electronic display 12 and an image may be captured of resulting image frame presented via the electronic display 12. The image may be processed to determine respective brightness of the display pixels 54. The respective brightness and input test data may then be input to a function to determine values for coefficients of the function. This process may be repeated for different test data to refine the coefficients. Later, the function and the coefficients may be used to determine which output gray level to expect in response to a respective input data value. The function with the coefficients may also be used to determine which input data value to use to cause the pixel to emit light at a desired output gray level.

Using the average voltage data for the row, at block 378, the image processing system 188 may generate row-to-row difference data 310 by subtracting the average voltage value of previous row from a current row. This may provide an indication of relative sign and magnitude change between the rows. At block 380, the image processing system 188 may transmit the row-to-row difference data 310 to the touch processing system 190.

FIG. 20 is a flowchart 394 illustrating a process for processing data to compensate for Switching DTX. Although certain operations of the flowchart 394 are presented in a particular order in FIG. 20, it should be understood that additional or fewer operations may be used in a same or different operational order than that presented below. Furthermore, although described herein as performed by the touch processing system 190, it should be understood that other circuitry may perform some or all of the operations described herein.

At block 396, the touch processing system 190 may receive the row-to-row difference data 310, and the sync information (e.g., the gate clock information and any additional sync data) from the image processing system 188. The additional sync data may include data used to estimate, approximate, or determine noise contributed to the touch scan data 198 from the Switching DTX.

At block 398, the touch processing system 190 may predict noise from image changes represented by the row-to-row difference data 310 and the sync information 312. The touch processing system 190 may use the row-to-row difference data 310 and/or the sync information 312 (e.g., gate clock information and/or the additional sync data) as inputs to a transfer function for the input/output relationship between the cathode layer 136 and touch processing system 190, such as a touch active front end (AFE) and/or a touch application specific integrated circuit (ASIC). By modeling the transfer function, the touch processing system 190 may determine the noise contribution to the touch scan data 198 by Switching DTX. The transfer function may be based on iterative methods that improve over time and frequency of compensation operations. In this way, an output from the transfer function may be used as one of the inputs for a next iteration. For example, a previously determined Switching DTX noise contribution value may be applied to the transfer function with the row-to-row difference data 310 and/or the sync information 312 (e.g., gate clock information and/or the additional sync data) to determine a current Switching DTX noise for the present the row-to-row difference data 310.

At block 400, the touch processing system 190 may receive touch scan data 198 from the electronic display 12. The touch driver interface 108 and/or touch sense interface 106 may generate the touch scan data 198 based on capacitance values measured during a touch sensing operation. At block 402, the touch processing system 190 may compensate for Switching DTX by canceling the predicted noise from Switching DTX from the received touch scan data 198. This may involve the touch processing system 190 subtracting the Switching DTX noise from indications of sensed capacitance indicated by the touch scan data 198.

The systems and methods described herein use determinations over regions, such as cells or rows, of data. Although some operations described here referenced operations performed to each cell or each row, it should be understood that these operations may be applied to regions of data or regions of the integrated image and touch display 186. For example, a region of cells may be used when generating the pixel map and/or the APL map. Or, as another example, a region of rows may be used to determine the row-to-row changes in data, such as two-to-two row changes, three-to-three row changes, or the like. This may include averaging image data, gray level data, voltage values determined based on the image data, current values determined based on the image data, or the like, between columns of respective rows, then using the averaged row data to determine the row-to-row difference data for two or more rows.

Impedance DTX may be an effect between any three body conductor as long as there is capacitance among the three. The effect may be the strongest when the unwanted parasitic coupling path is some significant, non-negligible portion of the touch baseline capacitance. Thus, the touch drive electrodes 104 and the touch sense electrodes 102 of the touch layer 130 may be in-plane (as shown in FIGS. 8 and 14) or may be out-of-plane and still be impacted by the Impedance DTX.

Impedance DTX and Switching DTX are described herein as compensated for using averaged data. However, Impedance DTX, Switching DTX, or both may be compensated using non-averaged data. For example, APL map 196 may include luminance values for each display pixel 54 as opposed to averaged pixel luminance data. Furthermore, the row-to-row difference data 310 may include pixel-to-pixel difference data, frame-to-frame difference data, column-to-column difference data, region-to-region difference data, or the like.

Keeping the foregoing in mind, data associated with the DTX compensations operations (e.g., data 310, 312, 194, 196, statistical data) may be transferred to a memory that is accessible by other systems (e.g., touch processing system 190). For example, the image processing system 188 may write pixel luminance data 196 to a memory and the touch processing system 190 may read the pixel luminance data 196 from the memory. The DTX compensations operations may consume large amounts of computing resources and power. To mitigate the large resource consumption, the SOC 184 may control how transactions are made to access and/or write the data associated with the DTX compensations. The SOC 184 may use bulk processing methods and/or real-time processing methods, and in some cases may use repeated data with either processing method.

Bulk processing methods may enable the image processing system 188 to write the data directly to an address space of the touch processing system 190 (or another system). Real-time processing methods may enable the image processing system 188 to write the data to an intermediary memory device accessible by other systems, such as the touch processing system 190. The touch processing system 190 may read data from the intermediary memory device to perform the DTX compensation operations. The SOC 184 may switch between bulk processing methods and real-time processing methods dynamically in response to real-time processing loads of the electronic device 10. For example, when the electronic device 10 is relatively idle, the SOC 184 may use the bulk processing methods, which may enable faster processing while queues are relatively empty. However, SOC 184 may use real-time processing methods in periods where processing loads are relatively high. The real-time processing methods may have defined processing durations, which may be shorter than a processing duration associated with bulk processing methods during a period of high demand.

As noted above, the touch processing system 190 may repeat using data from a previous frame to compensate for Impedance DTX and Switching DTX. In some cases, the switch from real-time processing to repeated data processing may be based on whether timing of the compensation operations are meeting timing specifications. When the compensation operations are performed too slowly, the touch processing system 190 may switch to performing the compensation operations based on repeated data (e.g., replayed frame) from a previous compensation operation. To perform frame replay, some or all of the image frame and header data may be stored in a buffer (e.g., a memory) accessible by a touch processing system 190, which may determine to replay the image frame and, in response to the determination, may access the image frame from the buffer. In some systems, each image frame may be sent to the buffer of the touch processing system 190 such that some or all of the data of the image frame and image frame header is stored in the buffer at each transaction, which may enable the SOC 184 to readily switch to the replay operational mode for a current transaction if desired.

When replaying a frame, some previous image frame data may be re-sent to the touch processing system 190. However, despite some of the image frame packet data being replayed, image data content and other data of the packet may be updated. Less processing time may be spent determining the frame statistical data for replayed frame data.

Figure 21:
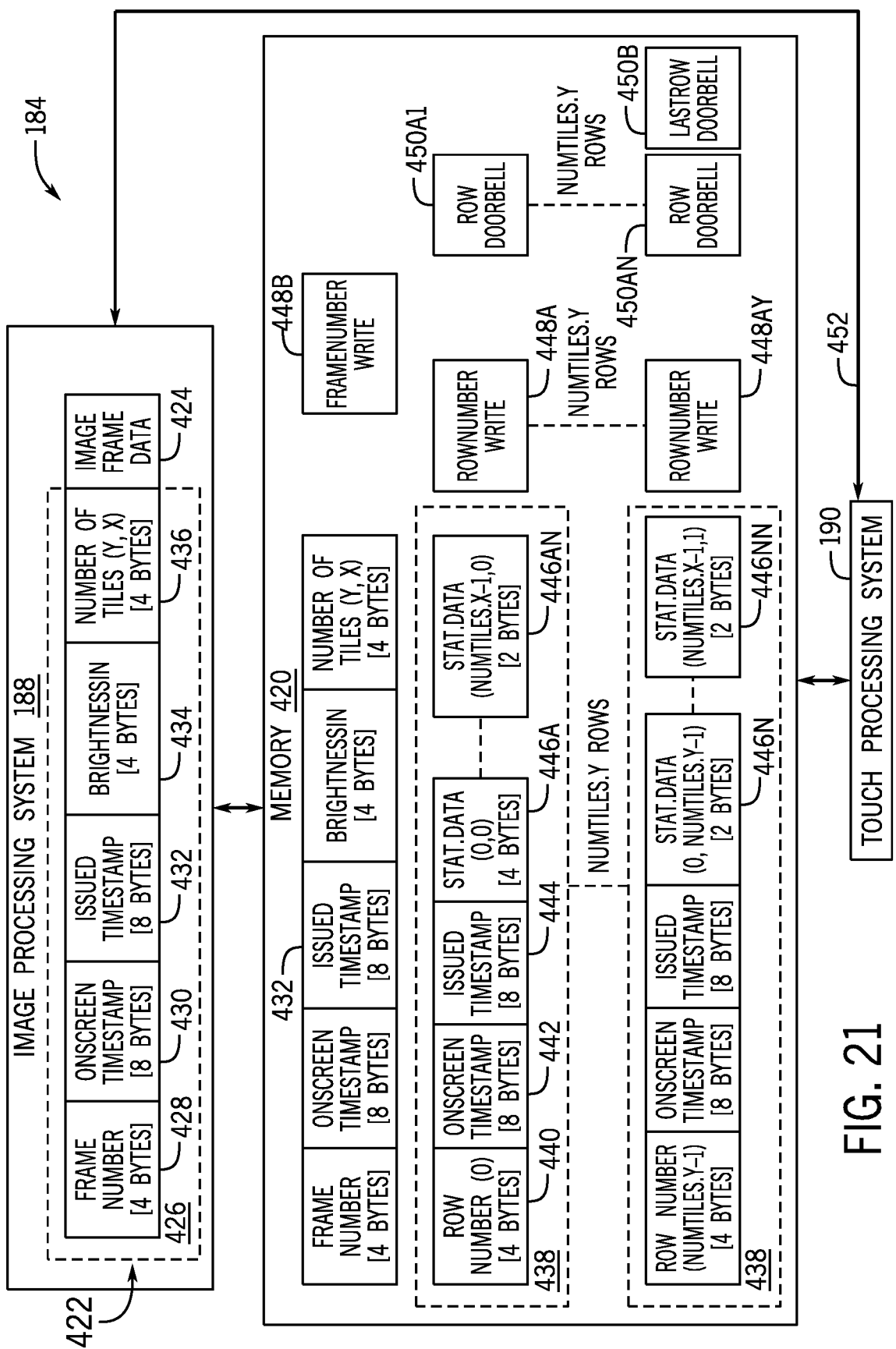
FIG. 21 is a block diagram of an example system-on-chip (SOC) that uses a memory buffer between image processing circuitry and the touch processing system of FIG. 10 and/or FIG. 16, in accordance with an embodiment.

To elaborate, FIG. 21 is a block diagram of an example SOC 184 that is using real-time processing methods based on a buffer memory 420. Here, the image processing system 188 previously received an image frame data packet 422 and has stored some of the image frame data packet 422 in the buffer memory 420.

The image frame data packet 422 may include image data 424 and a frame header 426. The frame header 426 may include an indication of a frame number 428 (e.g., a count that indicates which of a sequential order of image frames that image frame corresponds to), an onscreen timestamp 430 (e.g., a time of a global system clock at which a first pixel of the display 12 is to present a first piece of data of the image frame), an issued timestamp 432 (e.g., when the transaction issued, maybe used in debug operations), an indication of brightness 434 to be used when presenting the image frame (e.g., where brightness changes how much noise is to be compensated via DTX compensation operations and thus said compensation operations may be based on this brightness data), and an indication of a number of tiles 436 associated with the DTX compensation operations. It is noted that although the image frame data packet 422 includes the data 428-436, in an actual implementation additional or fewer data may be included. Each row of image data of the image frame data packet 422 may include a respective row-level header that includes some row-specific data and a row of image data from the image frame data 424.

The frame header 426 may be saved by the image processing system 188 into the memory 420. With it, the image processing system 188 may save respective row-level headers in association with frame statistical data (e.g., data 310, 312, 194, 196, statistical data) for the associated row. For example, a row-level header 438 may include an indication of a row number 440, a respective onscreen timestamp 442, a respective issued timestamp 444, and frame statistical data 446. The image processing system 188 may generate the frame statistical data 446 based on image data of at least that row. Indeed, the image processing system 188 may generate the frame statistical data 446 based on the changes of the image data relative to the adjacent rows (e.g., differences), as described earlier. The frame statistical data 446 may include a value for each number of touch sense regions 56 corresponding to the row of display pixels 54 and a number of rows of the frame statistical data 446 may correspond to a number of touch sense regions 56 corresponding to a column of the display pixels 54. Thus, the frame statistical data 446, when considered for the entire image frame data packet, includes N bytes (e.g., 2 bytes) of data for each touch sense region 56 of the display 12.

In addition to storing some of the image frame data packet 422, the memory 420 may also receive indications of status updates 448 from the image processing system 188. The memory 420 may expose the indications of the status updates 448 to other systems of the electronic device 10, including the touch processing system 190. Some status updates 448A correspond to a completion status of each row (e.g., row A to row AY, where Y represents a number of rows) and a different status updates 448B indicates which of multiple frame numbers is being written to the electronic display 12. Furthermore, in addition to storing some of the image frame data packet 422, the memory 420 may also receive doorbell indications 450 (row doorbell 450A, last-row doorbell 450B).

The timing of the operations may be managed by exchanging signals (e.g., interrupt signals) between an issuing side and a receiving side of the electronic display 12. These signals may correspond to the doorbell indications 450. It is this timing that may guide the switch between the real-time processing mode, the bulk processing mode, and/or the replay processing mode. For example, a timing difference between two interrupt signals may be used to determine to send a header and bypass the memory 420. It is noted that when operating in the bulk processing mode, the image processing system 18 may send data to the touch processing system 190 directly via a direct communicative coupling 452. The direct communicative coupling 452 may bypass the buffer memory 420. Using the direct communicative coupling 452 and supporting processing infrastructure of the bulk processing mode may sometimes be faster than the real-time processing mode but may sometimes be slower than the real-time processing mode based on outstanding processing transactions.

Indeed, the row doorbell 450A may indicate when each row of the image frame data packet 422 has been written to and/or is available for access by the electronic display 12 driving circuitry. An additional doorbell signal, the lastrow doorbell 450B, may indicate that a last row of the image frame data packet 422 has been written and/or is available for access. The doorbell indication 450 may correspond to, may be interrupt commands, and/or may be used in conjunction with interrupt commands to control other operations in response to the issuance of the one or more doorbell indications 450.

Furthermore, the timing of operations described herein may be based on a timestamp of a system clock, which may be compared to a timestamp of processing operation to verify the timing of the operations. These timestamps may include the onscreen timestamp 430, 442 and/or the issued timestamp 432, 444. A timing generator may manage the timestamps and/or monitor the timing to determine whether to instruct the data management system to switch between real-time processing or repeated processing operations.

When repeating the processing operations, data associated with the previous image frame that is repeated (e.g., replayed frame) may include statistics, cadence of communications (e.g., timing) corresponding to the statistics, or the like. Indeed, geometry configurations that change how the image processing system 188 determines the statistical data 446 are not changed between replayed frames. Geometry configurations may include an indication of an active region to use to gather statistical data over, a number of tiles used in the averaging or processing operations, a starting tile indication, a tile size indication, or the like. Repeating the processing operations to compensate for Impedance DTX and/or Switching DTX may not necessarily mean that image frame data is also being repeated. Indeed, the image frame itself may change even when the statistical data 446 used by the touch processing system 190 to compensate for Impedance DTX and/or Switching DTX is repeated.

In some cases, the timing generator may add intraframe pauses to a control flow of presenting the image frame. An intra-frame pause may be a period of time during which a pixel scanning operation is temporarily stopped. This may electrically permit the display panel to allow time for touching scanning. The insertion of an intraframe pause may delay image data presentation for some pixels. Thus, some timestamps may be modified based on a delay intentionally added for the intra-frame pause(s).

Technical effects include using the described systems and methods to improve touch performance in integrated image and touch display when unwanted parasitic coupling is present in the circuitry between three conducting layers. These error determination and cancellation systems and methods may be broadly applied to other systems as well, which may include a range of devices like phones, tablets, watches, desktop computers, laptop computers, or the like. By reducing the error contributions from Switching DTX and/or Impedance DTX based on image frame luminance data, and thus power drawn by pixels, the accuracy and reliability of touch sense data may improve. Furthermore, power consumed by the touch processing system and/or the touch sensing circuitry in the display may be reduced. The systems and methods may also enable high touch frequency operations.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Furthermore, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
   an electronic display configured to display image data and obtain touch scan data corresponding to at least one touch sense region of the electronic display;
   an image processing system configured to:
      receive an image frame data packet comprising the image data; and
      determine statistical data corresponding to the at least one touch sense region of the electronic display based on the image data;
      write the statistical data to memory;
      write a doorbell indication to the memory after each respective row of the image data is sent to the electronic display; and
   a touch processing system configured to:
      read the statistical data from the memory;
      compensate the touch scan data using the statistical data to obtain compensated touch scan data; and
      use the compensated touch scan data to determine a proximity of a capacitive object to the at least one touch sense region of the electronic display.

2. The system of claim 1, wherein the image processing system is configured to generate the statistical data at least in part by:

dividing the image data into a plurality of cells of a pixel map respectively corresponding to a plurality of touch sense regions, wherein different portions of the image data correspond to different cells of the plurality of cells, wherein one cell of the plurality of cells comprises at least a portion of the image data, and wherein the plurality of touch sense regions comprise the at least one touch sense region; and determining, for each cell of the plurality of cells, an average of luminance data corresponding to the image data for that respective cell, wherein the averaged luminance data is generated based on the statistical data.

3. The system of claim 2, wherein the touch processing system is configured to compensate the touch scan data using the averaged luminance data and a global brightness value configured to indicate an overall light intensity of the electronic display.

4. The system of claim 3, wherein the touch processing system is configured to compensate the touch scan data at least in part by determining an impedance of the at least one touch sense region using the averaged luminance data and the global brightness value.

5. The system of claim 1, wherein the image processing system is configured to generate the statistical data at least in part by:
   determining a first gray level value corresponding to a first row of the image data;
   determining a second gray level value corresponding to a second row of the image data; and
   generating row-to-row difference data based on a difference between the first gray level value and the second gray level value.

6. The system of claim 5, wherein the image processing system is configured to generate the row-to-row difference data at least in part by:
   converting the first gray level value to a first voltage value based on the first gray level value, a display brightness value, and a gray-to-voltage mapping function; and
   converting the second gray level value to a second voltage value based the second gray level value, the display brightness value, and the gray-to-voltage mapping function.

7. The system of claim 5, wherein the touch processing system is configured to compensate the touch scan data to account for noise using the statistical data and gate clocking information to obtain the compensated touch scan data.

8. The system of claim 1, wherein the electronic display comprises an integrated image and touch display, wherein the touch processing system is communicatively coupled to the image processing system via buffer memory and via a direct communicative coupling, and wherein in one operational mode the image processing system sends data to the touch processing system via the buffer memory, and wherein in a second operational mode the image processing system sends the data to the touch processing system via the direct communicative coupling that bypasses the buffer memory.

9. The system of claim 1, wherein the image processing system is configured to process the image data to generate the statistical data at least in part by:
   determining a first voltage value for a first row of the image data based on using at least a portion of the first row of the image data as a variable in a first gray-to-voltage mapping function;
   determining a second voltage value for a second row of the image data based on using at least a portion of the second row of the image data as a variable in a second gray-to-voltage mapping function; and
   generating row-to-row difference data based on a difference between the first voltage value and the second voltage value.

10. The system of claim 9, wherein the first gray-to-voltage mapping function equals the second gray-to-voltage mapping function.

11. A non-transitory, tangible, computer-readable medium comprising instructions that, when executed by a processor, are configured to cause a touch processing system to perform operations comprising:
   receiving averaged luminance data associated with operation of an electronic display, wherein an image processing system is configured to receive image data corresponding to at least a portion of a first image frame to be displayed and at least a portion of a second image frame previously displayed on the electronic display and to determine an average luminance of the image data corresponding to a touch sense region of the electronic display to generate the averaged luminance data;
   receiving touch scan data from the electronic display, wherein the electronic display is configured to obtain the touch scan data;
   compensating the touch scan data based on using the averaged luminance data to obtain compensated touch scan data; and
   determining a proximity of a capacitive object to the touch sense region of the electronic display based on the compensated touch scan data.

12. The computer-readable medium of claim 11, wherein compensating the touch scan data comprises operations to:
   determine an amount of error based on the averaged luminance data; and
   remove the amount of error from the touch scan data to generate compensated touch scan data.

13. The computer-readable medium of claim 12, wherein receiving the averaged luminance data comprises reading a buffer memory configured to store the averaged luminance data after the image processing system writes the averaged luminance data to the buffer memory.

14. The computer-readable medium of claim 12, wherein the averaged luminance data comprises row-to-row difference voltage data, and wherein the row-to-row difference voltage data is configured to be generated based on a difference between averaged voltage values of two or more rows of the image data corresponding to the touch sense region.

15. The computer-readable medium of claim 11, wherein the operations comprise:
   receiving additional touch scan data corresponding to a next touch sensing operation performed while a second image frame is being presented via the electronic display; and
   compensating the additional touch scan data based on replaying the averaged luminance data, wherein the averaged luminance data corresponds to previously presented image data of the first image frame.

16. A device comprising:
   an electronic display;
   a first processing system coupled to the electronic display, wherein the first processing system is configured to:
      receive an image frame data packet corresponding to a first image frame; and
      generate statistical data based on the image frame data packet;

a memory coupled to the first processing system, wherein the memory receives the statistical data from the first processing system; and a second processing system coupled to the memory and to the electronic display, wherein the second processing system is configured to:

read the statistical data from the memory;

receive touch scan data from the electronic display;

determine an amount of error expected to effect touch scan data during a touch sensing operation based on the statistical data;

compensate the touch scan data to account for the amount of error using the statistical data to generate compensated touch scan data;

use the compensated touch scan data to determine a proximity of a capacitive object to at least one touch sense region of the electronic display;

receive additional touch scan data for a next touch sensing operation corresponding to a second image frame presented after the first image frame; and compensate the additional touch scan data based on replaying the statistical data.

17. The device of claim 16, wherein the statistical data comprises an average pixel luminance (APL) map of cells, wherein cells of the APL map of cells are configured to respectively correspond to different touch sense regions of the electronic display, and wherein each of the cells is configured to comprise a pixel luminance value that is an average of current values for each pixel associated with a touch sense region corresponding to that cell.

18. The device of claim 17, wherein the second processing system is configured to determine the amount of the error expected to affect the touch scan data during the touch sensing operation based on the APL map of cells and a global display brightness value.

19. The device of claim 16, wherein the statistical data comprises row-to-row difference data indicative of a difference between averaged voltage values of two or more rows of image data, and wherein determining the amount of the error includes applying the statistical data and clocking information to a function as inputs.

20. The device of claim 16, wherein the second processing system is configured to generate a notification based on the proximity triggering an execution of an application.

21. The device of claim 16, wherein the first processing system is configured to generate the statistical data based on image data to be presented during the touch sensing operation.

22. The device of claim 16,
wherein the statistical data corresponds to at least a portion of previously presented image data of the first image frame.

23. The device of claim 22, wherein the memory is configured to store the statistical data until at least after the second image frame is presented.

24. The device of claim 16, wherein the image frame data packet comprises image data and a header, wherein the header comprises a frame number indication, a timestamp indication, and a brightness indication.

25. The device of claim 24, wherein the first processing system writes the header and the statistical data to the memory, and wherein the first processing system writes a doorbell indication to the memory after each respective row of the image data is sent to the electronic display.

26. The device of claim 24, wherein the first processing system is configured to:

receive a first interrupt signal and a second interrupt signal from the electronic display;

determine a timing difference between the first interrupt signal and the second interrupt signal; and send the header to the second processing system at least in part by bypassing the memory based on the timing difference and the timestamp indication.

27. The device of claim 16, wherein the first processing system is configured to add an intraframe pause between two sequential data rows of the image frame data packet, and wherein driver circuitry of the electronic display generates the touch scan data during the intraframe pause.

* * * * *